US010476952B1

United States Patent
Badawy et al.

(10) Patent No.: US 10,476,952 B1
(45) Date of Patent: *Nov. 12, 2019

(54) SYSTEM AND METHOD FOR PEER GROUP DETECTION, VISUALIZATION AND ANALYSIS IN IDENTITY MANAGEMENT ARTIFICIAL INTELLIGENCE SYSTEMS USING CLUSTER BASED ANALYSIS OF NETWORK IDENTITY GRAPHS

(71) Applicant: SailPoint Technologies, Inc., Wilmington, DE (US)

(72) Inventors: Mohamed M. Badawy, Round Rock, TX (US); Jostine Fei Ho, Austin, TX (US)

(73) Assignee: SailPoint Technologies, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,803

(22) Filed: May 21, 2019

Related U.S. Application Data

(63) Continuation of application No. 16/201,604, filed on Nov. 27, 2018, now Pat. No. 10,341,430.

(51) Int. Cl.
*H04L 29/08* (2006.01)
*G06F 16/35* (2019.01)
(Continued)

(52) U.S. Cl.
CPC ........ *H04L 67/1044* (2013.01); *G06F 16/345* (2019.01); *G06F 16/355* (2019.01);
(Continued)

(58) Field of Classification Search
CPC ....... H04L 9/32; H04L 29/06823–0685; H04L 29/06904; H04L 29/08675;
(Continued)

(56) References Cited

U.S. PATENT DOCUMENTS 7,526,785 B1 4/2009 Pearson et al.
8,065,712 B1 * 11/2011 Cheng .................. H04L 63/105
726/1

(Continued)

OTHER PUBLICATIONS

Seltzer, Jerome H. et al., "The Protection of Information in Computer Systems," Proceedings of the IEEE, 63(9), Sep. 1975, pp. 1278-1308.

(Continued)

*Primary Examiner* — Brendan Y Higa
(74) *Attorney, Agent, or Firm* — Sprinkle IP Law Group

(57) ABSTRACT

Systems and methods for graph based artificial intelligence systems for identity management systems are disclosed. Embodiments of the identity management systems disclosed herein may utilize a network graph approach to peer grouping of identities of distributed networked enterprise computing environment. Specifically, in certain embodiments, data on the identities and the respective entitlements assigned to each identity as utilized in an enterprise computer environment may be obtained by an identity management system. A network identity graph may be constructed using the identity and entitlement data. The identity graph can then be clustered into peer groups of identities. The peer groups of identities may be used by the identity management system and users thereof in risk assessment or other identity management tasks.

21 Claims, 10 Drawing Sheets

(51) Int. Cl.
*G06F 16/34* (2019.01)
*H04L 29/06* (2006.01)
*G06F 16/906* (2019.01)
*G06F 16/901* (2019.01)
*G06N 20/00* (2019.01)

(52) U.S. Cl.
CPC ........ *G06F 16/906* (2019.01); *G06F 16/9024* (2019.01); *H04L 29/06843* (2013.01); *H04L 29/06904* (2013.01); *H04L 63/08* (2013.01); *H04L 63/10* (2013.01); *H04L 63/104* (2013.01); *H04L 67/1074* (2013.01); *G06N 20/00* (2019.01)

(58) Field of Classification Search
CPC . H04L 41/14–147; H04L 41/22; H04L 63/08; H04L 63/10–108; G06Q 10/0635–06398; G06F 16/285; G06F 16/335–358; G06F 16/9024; G06F 16/906
See application file for complete search history.

(56) References Cited

U.S. PATENT DOCUMENTS

| | | | |
|---|---|---|---|
| 8,209,742 B2 | 6/2012 | Schreiber et al. | |
| 8,683,546 B2* | 3/2014 | Dunagan | G06F 21/577 726/1 |
| 9,077,728 B1* | 7/2015 | Hart | H04L 63/104 |
| 9,246,945 B2 | 1/2016 | Chari et al. | |
| 9,288,232 B2 | 3/2016 | Chari et al. | |
| 9,679,125 B2* | 6/2017 | Bailor | G06F 21/316 |
| 9,699,196 B1* | 7/2017 | Kolman | G06F 16/285 |
| 9,819,685 B1* | 11/2017 | Scott | H04L 63/104 |
| 9,992,230 B1* | 6/2018 | Haverty | H04L 63/20 |
| 10,341,430 B1 | 7/2019 | Badawy et al. | |
| 2002/0026592 A1* | 2/2002 | Gavrila | G06F 21/6218 726/6 |
| 2007/0067845 A1* | 3/2007 | Wiemer | G06F 21/577 726/25 |
| 2007/0226248 A1* | 9/2007 | Darr | G06Q 10/10 |
| 2008/0091681 A1 | 4/2008 | Dwivedi et al. | |
| 2008/0288330 A1* | 11/2008 | Hildebrand | G06Q 10/06 705/7.28 |
| 2009/0222894 A1 | 9/2009 | Kenny et al. | |
| 2009/0300711 A1 | 12/2009 | Tokutani et al. | |
| 2010/0082695 A1* | 4/2010 | Hardt | G06F 16/972 707/798 |
| 2010/0274815 A1* | 10/2010 | Vanasco | G06Q 10/107 707/798 |
| 2011/0209196 A1 | 8/2011 | Kennedy | |
| 2012/0023576 A1 | 1/2012 | Sorensen et al. | |
| 2012/0216243 A1 | 8/2012 | Gill et al. | |
| 2012/0246098 A1 | 9/2012 | Chari et al. | |
| 2013/0232539 A1* | 9/2013 | Polunin | G06Q 10/047 726/1 |
| 2013/0254833 A1 | 9/2013 | Nicodemus et al. | |
| 2013/0283339 A1 | 10/2013 | Biswas et al. | |
| 2014/0207813 A1* | 7/2014 | Long | G06F 21/55 707/758 |
| 2015/0128211 A1* | 5/2015 | Kirner | H04L 63/10 726/1 |
| 2015/0379429 A1 | 12/2015 | Lee | |
| 2016/0203327 A1* | 7/2016 | Akkiraju | G06F 16/9024 707/785 |
| 2016/0294645 A1* | 10/2016 | Kirner | H04L 41/0813 |
| 2016/0294646 A1* | 10/2016 | Kirner | H04L 41/5054 |
| 2017/0220964 A1* | 8/2017 | Datta Ray | H04L 63/1433 |
| 2017/0310552 A1* | 10/2017 | Wallerstein | H04L 41/22 |
| 2017/0364534 A1 | 12/2017 | Zhang | |
| 2018/0069899 A1 | 3/2018 | Lang | |

OTHER PUBLICATIONS

Bishop, Matt et al., "We have Met the Enemy and He is Us," NSPW '08: Proceedings of the 2008 workshop on New Security paradigms, Sep. 2008, 11 pgs.

Frank, Mario et al., "A probabilistic approach to hybrid role mining," CCS '09, Nov. 2009, 11 pgs.

Molloy, Ian et al., "Generative Models for Access Control Policies: Applications to Role Mining Over Logs with Attribution," Proceedings of the 17th ACM Symposium on Access Control Models and Technologies, SACMAT, Jun. 2012, 11 pgs.

Blei, David M. et al., "Latent Dirichlet Allocation." Journal of Machine Learning Research 3, Jan. 2003, pp. 993-1022.

McDaniel, Patrick et al., "Securing Distributed Applications Using a Policy-based Approach," Ann Arbor, Dec. 19, 2003, 48109-2122, 24 pgs.

Chen, Ying et al., "Data Mining and Service Rating in Service-Oriented Architectures to Improve Information Sharing," 2005 IEEE Aerospace Conference, (Version 7, Updated Jan. 27, 2005) Mar. 2005, 11 pgs.

Molloy, Ian, "Automatic Migration to Role-Based Access Control," CERIAS Tech Report 2010-34, Purdue University, IN, Thesis Dissertation/Acceptance, Aug. 2010, 178 pgs.

Ene, Alina et al., "Fast Exact and Heuristic Methods for Role Minimization Problems," SACMAT '08 Proceedings of the 13th ACM symposium on Access control models and technologies, Estes, CO, Jun. 11-13, 2008, pp. 1-10.

Harrison, Michael A. et al., "Protection in Operating Systems," Communications of the ACM, vol. 19, No. 8, Aug. 1976, pp. 461-471.

Li, Ninghui et al., "Access Control Policy Combining: Theory Meets Practice," Proceedings of the 14th ACM symposium on Access control models and technologies SACMAT '09, Jun. 3-5, 2009, 10 pgs.

Schneider, Fred B., "Least Privilege and More," IEEE Security & Privacy, vol. 1, Issue 5, Sep. 2003, pp. 209-213.

Office Action for U.S. Appl. No. 13/970,174, dated Nov. 4, 2014, 22 pgs,.

Office Action for U.S. Appl. No. 13/904,350, dated Nov. 14, 2014, 33 pgs.

Office Action for U.S. Appl. No. 13/904,350, dated Apr. 27, 2015, 28 pgs.

Office Action for U.S. Appl. No. 13/970,174, dated Jun. 24, 2015, 22 pgs.

Xu, Wei et al., Taint-Enhanced Policy Enforcement: A Practical Approach to Defeat a Wide Range of Attacks, 15th USENIX Security Symposium, 2006, pp. 121-136.

Notice of Allowance for U.S. Appl. No. 16/286,269, dated Jun. 4, 2019, 6 pgs.

Notice of Allowance for U.S. Appl. No. 16/286,850, dated Aug. 1, 2019, 7 pgs.

Notice of Allowance for U.S. Appl. No. 16/459,104 dated Sep. 17, 2019, 7 pgs.

Notice of Allowance for U.S. Appl. No. 16/286,289, dated Sep. 23, 2019, 5 pgs.

\* cited by examiner

SYSTEM AND METHOD FOR PEER GROUP DETECTION, VISUALIZATION AND ANALYSIS IN IDENTITY MANAGEMENT ARTIFICIAL INTELLIGENCE SYSTEMS USING CLUSTER BASED ANALYSIS OF NETWORK IDENTITY GRAPHS

RELATED APPLICATIONS

This application is a continuation of, and claims a benefit of priority under 35 U.S.C. 120 of the filing date of U.S. patent application Ser. No. 16/201,604 filed Nov. 27, 2018, entitled "SYSTEM AND METHOD FOR PEER GROUP DETECTION, VISUALIZATION AND ANALYSIS IN IDENTITY MANAGEMENT ARTIFICIAL INTELLIGENCE SYSTEMS USING CLUSTER BASED ANALYSIS OF NETWORK IDENTITY GRAPHS", which is fully incorporated herein by reference for all purposes.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to computer security. In particular, this disclosure relates to identity management in a distributed and networked computing environment. Even more specifically, this disclosure relates to graph based identity peer grouping and analysis, and uses of the same for identity governance and management in an enterprise computing environment.

BACKGROUND

Acts of fraud, data tampering, privacy breaches, theft of intellectual property, and exposure of trade secrets have become front page news in today's business world. The security access risk posed by insiders—persons who are granted access to information assets—is growing in magnitude, with the power to damage brand reputation, lower profits, and erode market capitalization.

Identity Management (IM), also known as Identity and Access Management (IAM) or Identity Governance (IG), is, the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving governance, access risk management, and compliance to the forefront of identity management. To effectively meet the requirements and desires imposed upon enterprises for identity management, these enterprises may be required to prove that they have strong and consistent controls over who has access to critical applications and data. And, in response to regulatory requirements and the growing security access risk, most enterprises have implemented some form of user access or identity governance.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Organizations that are unable to focus their identity compliance efforts on areas of greatest access risk can waste time, labor, and other resources applying compliance monitoring and controls across the board to all users and all applications. Furthermore, with no means to establish a baseline measurement of identity compliance, organizations have no way to quantify improvements over time and demonstrate that their identity controls are working and effectively reducing access risk.

Information Technology (IT) personnel of large organizations often feel that their greatest security risks stemmed from "insider threats," as opposed to external attacks. The access risks posed by insiders range from careless negligence to more serious cases of financial fraud, corporate espionage, or malicious sabotage of systems and data. Organizations that fail to proactively manage user access can face regulatory fines, litigation penalties, public relations fees, loss of customer trust, and ultimately lost revenue and lower stock valuation. To minimize the security risk posed by insiders (and outsiders), business entities and institutions alike often establish access or other governance policies that eliminate or at least reduce such access risks and implement proactive oversight and management of user access entitlements to ensure compliance with defined policies and other good practices.

To assist in mitigating these risks, therefore, it is of utmost importance to effectively analyze access or entitlement data in the enterprise environment to determine or assess the efficacy or enforcement of such governance policies and to identify potential risks. Consequently, what is desired are improved ways to quantitatively or qualitatively analyze access data in distributed networked computing environment and to utilize the results of such analysis to improve identity governance in that environment.

SUMMARY

Accordingly, to ameliorate or address these issues, among other ends, embodiments of the identity management systems disclosed herein may utilize a network graph approach to peer grouping of identities of distributed networked enterprise computing environment. Specifically, in certain embodiments, data on the identities and the respective entitlements assigned to each identity as utilized in an enterprise computer environment may be obtained by an identity management system. Using the identity and entitlement data, then, a network identity graph may be constructed, where the nodes of the graph correspond to, and represent, each of the identities. Each edge (or relationship) of the graph may join two nodes of the graph and be associated with a similarity weight representing a degree of similarity between the identities of the respective nodes. The identity graph may then be pruned to remove weak edges (e.g., those edges whose similarity weight may fall below a pruning threshold). The pruned identity graph can then be clustered into peer groups of identities (e.g., using a graph based community detection algorithm). These peer groups of identities can then be stored (e.g., separately or in the identity graph) and used by the identity management system. For example, a visual representation of the graph may be presented to a user of the identity management to assist in compliance or certification assessments or evaluation of the identities and entitlements as currently used by the enterprise.

In certain embodiments, the clustering of identities may be optimized based on a peer group assessment metric, such as, for example, graph modularity determined based on the identity graph or the determined peer groups. For instance, in one embodiment if a peer group assessment metric is below (or above) a quality threshold a feedback loop may be instituted whereby the pruning threshold is adjusted by some amount (up or down) and the originally determined identity graph is pruned based on the adjusted pruning threshold (or the previously pruned identity graph may be further pruned). This newly pruned identity graph can then be clustered into new peer groups of identities and a peer group assessment metric determined based on the newly pruned identity graph or the newly determined peer groups. If this new peer assessment metric is now above (or below) the quality threshold the feedback loop may stop and these peer groups of identities can then be stored (e.g., separately or in the identity graph) and used by the identity management system.

Otherwise, the feedback loop may continue by again adjusting the pruning threshold further (e.g., further up or further down relative to the previous iteration of the feedback loop), re-pruning the identity graph based on the adjusted pruning threshold, clustering this newly pruned graph, determining another peer group assessment metric and comparing this metric to the quality threshold. In this manner, the feedback loop of adjustment of the pruning threshold, re-pruning the graph, re-clustering the identity graph into peer groups may be repeated until the peer group assessment metric reaches a desired threshold. Moreover, by tailoring the peer group assessment metric and quality threshold to include or reflect domain or enterprise specific criteria, the clustering results (e.g., the peer groups resulting from the clustering) may more accurately reflect particular requirements or the needs of a particular enterprise or be better tailored to a particular use.

Embodiments provide numerous advantages over previously available systems and methods for measuring access risk. As embodiments are based on a graph representation of identity management data, the graph structure may serve as a physical model of the data, allowing more intuitive access to the data (e.g., via graph database querying, or via graph visualization techniques). This ability may yield deeper and more relevant insights for users of identity management systems. Such abilities are also an outgrowth of the accuracy of the results produced by embodiments as disclosed.

Moreover, embodiments as disclosed may offer the technological improvement of reducing the computational burden and memory requirements of systems implementing these embodiments through the improved data structures and the graph processing and analysis implemented by such embodiments. Accordingly, embodiments may improve the performance and responsiveness of identity management systems that utilize such embodiments of identity graphs and clustering approaches by reducing the computation time and processor cycles required (e.g., and thus improving processing speed) and simultaneously reducing memory usage or other memory requirements.

Similarly, a network graph approach to peer grouping will expose and utilize the strong homophily aspects inherent in this use case. By capturing the homophilic nature of identity governance, the opportunity arises for a large number of applications of the peer groups an identity graphs, including, for example, identification and mitigation of outlier identities, role mining, automation of access approval and certification campaigns, predictive modeling of entitlement spread or diffusion within a peer group or the whole population and compliance assessment use cases, among others.

As yet another advantage, embodiments may be dynamic with respect to time, allowing the development update processes using deltas between snapshots of data collection, bringing down operational costs and improving the performance and robustness of embodiments.

Moreover, the graph format used by certain embodiments, allows the translation of domain and enterprise specific concepts, phenomena, and issues into tangible, quantifiable, and verifiable hypotheses which may be examined or validated with graph-based algorithms. Accordingly, embodiments may be especially useful in assessing risk and in compliance with security policies or the like.

Historically, such security risks associated with user entitlements have been hard to quantify. In large organizations, user access data or data on user entitlements can be scattered across hundreds of systems and applications and can be difficult to compile, analyze, and present in a manageable format to the persons in position to act on the information. Consequently, most organizations attempt to manage risk in a decentralized manner, focusing on a single application or system at a time.

Such decentralized, one-at-a-time approaches have several drawbacks. With such approaches, managers, auditors or compliance officers may not gain enterprise level visibility of access risk across all at-risk resources. Risk management, even within an organization, may be applied sporadically and thus may prove to be insufficient or ineffective in minimizing access risks posed by inside users. Also, when risk management is decentralized, baselines (such as standards, measures, benchmarks, etc.) utilized in assessing risk may vary from department to department, system to system, and application to application even within the same organization. Moreover, previously available approaches can be time consuming, tedious, impracticable, and expensive since conventional risk management processes often consist of manual reviews of user entitlements and access lists.

Systems and methods disclosed herein can provide IT compliance and governance managers, auditors, compliance officers and others simple, intuitive means to assess the effectiveness of identity management and the associated access risk across large numbers of identities, entitlements, users, applications, systems, etc. By increasing the visibility of user access risk at various levels across various resources, enterprises can pinpoint at-risk areas and focus their security and access control efforts where such focus may be desired.

Various embodiments may thus allow for new, in-depth insights into access risk which can enable enterprises to efficiently, effectively, and globally track, analyze, and control user access to resources. Access risks can be quickly and easily assessed in some embodiments. Access risk issues can be identified, prioritized, and immediately remediated or mitigated in various embodiments. Access risk management, in accordance with various embodiments, can help ensure regulatory compliance in a cost effective manner while also meeting appropriate standards related to enterprise governance. In accordance with some embodiments, organizations can focus their access risk management efforts strategically, track progress over time, and provide quantifiable proof of enhanced security and reduced access risk.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
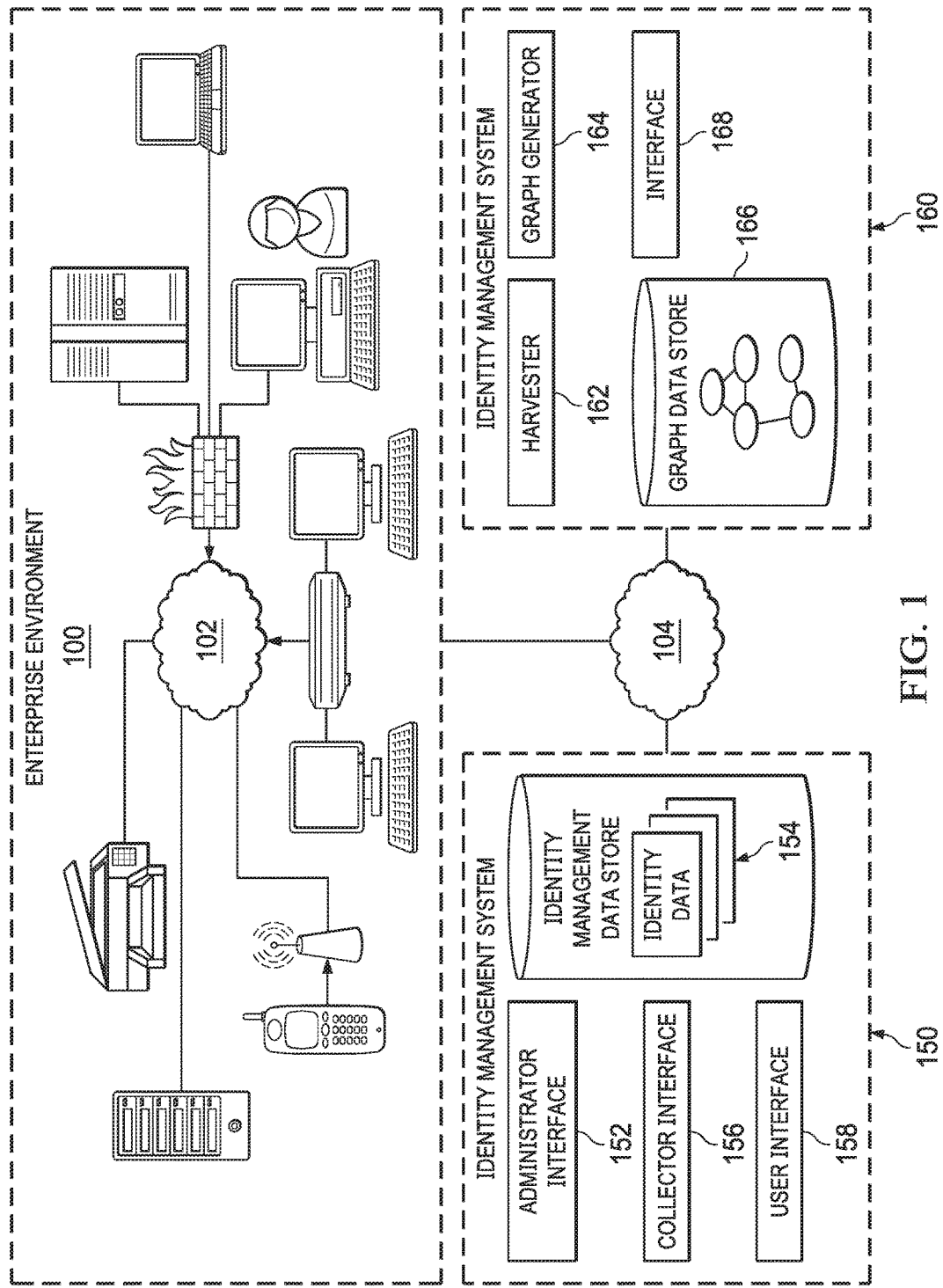
FIG. 1 is a block diagram of a distributed networked computer environment including one embodiment of an identity management system.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some context may be helpful. In response to regulatory requirements and security access risks and concerns, most enterprises have implemented some form of computer security or access controls. To assist in implementing security measures and access controls in an enterprise environment, many of these enterprises have implemented Identity Management in association with their distributed networked computer environments. Identity Management solutions allow the definition of a function or an entity associated with an enterprise. An identity may thus be almost physical or virtual thing, place, person or other item that an enterprise would like to define.

Identities can therefore be, for example, roles or capacities (e.g., manager, engineer, team leader, etc.), title (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual thing, place, person or other item. Each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc.

By managing the identity or identities to which users within the enterprise computing environment are assigned, the entitlements which a user may assigned (e.g., the functions or access which a user may be allowed) may be controlled. However, escalating security and privacy concerns are driving governance, access risk management, and compliance to the forefront of Identity Management. To effectively meet the requirements and desires imposed upon enterprises for Identity Management these enterprises may be required to prove that they have strong and consistent controls over who has access to critical applications and data.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

Generally, however, good governance practice in the identity space relies on the 'social' principle that identities with strongly similar attributes should be assigned similar, if not identical, access entitlements. In the realm of identity governance and administration, this approach allows for a separation of duties and thus makes it feasible to identify, evaluate, and prioritize risks associated with privileged access.

As part of a robust identity management system, it is therefore highly desirable to analyze an enterprise's data to identify potential risks. In principle, strictly enforced pre-existing governance policies should ensure that identities with strongly similar access privileges are strongly similar. It would thus be desirable to group or cluster the identities of an enterprise into peer groups such that the identities in a peer group are similar with respect to the set of entitlements assigned to the identities of that group (e.g., relative to other identities or other groups). Peer grouping of the identities within an enterprise (or viewing the peer groups of identities) may allow, for example, an auditor other person performing a compliance analysis or evaluation to quantitatively and qualitatively assess the effectiveness of any applicable pre-existing polices, or lack thereof, and how strictly they are enforced.

However, the data utilized by most identity management systems is not strictly numerical data. Often this data includes identifications of identities (e.g., alphanumeric identifiers for an identity as maintained by an identity management system) and identifications of entitlements associated with those identities (e.g., alphanumeric identifiers for entitlements as maintained by the identity management system. Clustering of this type of categorical data (e.g., for peer grouping of identities) is typically a harder task than clustering data of numerical type. In particular, clustering categorical data is particularly challenging since intuitive, geometric-based, distance measures experienced in real life, e.g., Euclidean distance, by definition, are exclusive to numerical data. A distance measure is a crucial component of any clustering algorithm as it is utilized at the lowest level to determine how similar/dissimilar two data points are.

For example, the one-hot-encoding data transform, which can convert categorical data into numerical data, does not work in these types of cases. Due to large number of entitlements, when combining the numerical, high-dimensional, one-hot encoded data with traditional geometric distances (e.g., Euclidean), distances between data points will be quite large and will make it hard, if not impossible, for a clustering algorithm to yield meaningful outputs. This is a direct mathematical outcome to the high dimensionality of the ambient space. It is a well-documented issue in data science literature, and the applicable nomenclature is "curse of dimensionality". Typical dimensionality reduction techniques, e.g., PCA, t-SNE, have been experimented with, but due to the way these clustering algorithms manipulate numerical data, the resulting transforms may manipulate the original data in ways that are not interpretable, hence not useful in this context.

Accordingly, conventional statistical clustering such as K-modes, or K-modes used in association with a data-mining, pattern-finding algorithm such as Equivalence Class Transformation (ECLAT), have thus proven inadequate. Many of the reasons for the inadequacy of such typical clustering approaches have to do with the computationally intensive nature of the computer implementations of such clustering, which are both computationally and memory intensive, reducing or hindering the performance and responsiveness of identity management systems that utilize such clustering approaches.

Attempts to remedy these problems by altering the clustering to discard or ignore less popular identities or entitlements to enhance the signal-to-noise ratio in their application have been less than successful, achieving neither adequate results in the clusters determined or in improving the performance or memory usage of systems which employ such clustering. Other workarounds for these deficiencies have also proven unworkable to this type of identity and entitlement data.

Moreover, when attempting to cluster based on categorical data, typical clustering algorithms do not capture the social aspects of identity governance. Homophily in social networks, as defined in social sciences, is the tendency of individuals to associate and bond with similar others. In identity governance, homophily in the identity space usually results as a consequence of enforcing the governance principle that similar identities should be assigned similar access entitlements. It is thus important to attempt to capture, or otherwise utilize this homophily, when peer grouping for identity management. As a consequence of all these deficiencies, the results from prior approach to identity clustering in the context of identity management were harder to interpret, yielding fewer insights, and negatively impacting the speed, efficiency, and overall quality of identity management systems. The data-driven clustering approach of identities into peer groups remains, however, a crucial component of identity management in a distributed and networked computing environment for a variety of reasons, including the usefulness of reviewing and visualizing such clusters of identities for auditing and compliance purposes.

Accordingly, to ameliorate these issues, among other ends, embodiments of the identity management systems disclosed herein may utilize a network graph approach to peer grouping of identities of distributed networked enterprise computing environment. Specifically, in certain embodiments, data on the identities and the respective entitlements assigned to each identity as utilized in an enterprise computer environment may be obtained by an identity management system. Using the identity and entitlement data, then, a network identity graph may be constructed, where the nodes of the graph correspond to, and represent, each of the identities. Each edge (or relationship) of the graph may join two nodes of the graph and be associated with a similarity weight representing a degree of similarity between the identities of the respective nodes. The identity graph may then be pruned to remove weak edges (e.g., those edges whose similarity weight may fall below a pruning threshold). The pruned identity graph can then be clustered into peer groups of identities (e.g., using a graph based community detection algorithm). These peer groups of identities can then be stored (e.g., separately or in the identity graph) and used by the identity management system. For example, a visual representation of the graph may be presented to a user of the identity management to assist in compliance or certification assessments or evaluation of the identities and entitlements as currently used by the enterprise.

In certain embodiments, the clustering of identities may be optimized based on a peer group assessment metric, such as, for example, graph modularity determined based on the identity graph or the determined peer groups. For instance, in one embodiment if a peer group assessment metric is below (or above) a quality threshold a feedback loop may be instituted whereby the pruning threshold is adjusted by some amount (up or down) and the originally determined identity graph is pruned based on the adjusted pruning threshold (or the previously pruned identity graph may be further pruned). This newly pruned identity graph can then be clustered into new peer groups of identities and a peer group assessment metric determined based on the newly pruned identity graph or the newly determined peer groups. If this new peer assessment metric is now above (or below) the quality threshold the feedback loop may stop and these peer groups of identities can then be stored (e.g., separately or in the identity graph) and used by the identity management system.

Otherwise, the feedback loop may continue by again adjusting the pruning threshold further (e.g., further up or further down relative to the previous iteration of the feedback loop), re-pruning the identity graph based on the adjusted pruning threshold, clustering this newly pruned graph, determining another peer group assessment metric and comparing this metric to the quality threshold. In this manner, the feedback loop of adjustment of the pruning threshold, re-pruning the graph, re-clustering the identity graph into peer groups may be repeated until the peer group assessment metric reaches a desired threshold. Moreover, by tailoring the peer group assessment metric and quality threshold to include or reflect domain or enterprise specific criteria, the clustering results (e.g., the peer groups resulting from the clustering) may more accurately reflect particular requirements or the needs of a particular enterprise or be better tailored to a particular use.

Embodiments may thus provide a number of advantages including allowing more intuitive access to the data (e.g., via graph database querying, or via graph visualization techniques), which may, in turn, yield deeper and more relevant insights for users of identity management systems. Moreover, embodiments as disclosed may offer the technological improvement of reducing the computational burden and memory requirements of systems implementing these embodiments through the improved data structures and the graph processing and analysis implemented by such embodiments. Accordingly, embodiments may improve the performance and responsiveness of identity management systems that utilize such embodiments. Likewise, embodiments may be dynamic with respect to time, allowing the development update processes using deltas between snapshots of data collection, bringing down operational costs and improving the performance and robustness of embodiments. Moreover, the graph format used by certain embodiments, allows the translation of domain and enterprise specific concepts, phenomena, and issues into tangible, quantifiable, and verifiable hypotheses which may be examine or validate with graph based algorithms. Accordingly, embodiments may be especially useful in assessing risk and in compliance with security policies or the like.

Turning first to FIG. 1, then, a distributed networked computer environment including one embodiment of an identity management system is depicted. Here, the networked computer environment may include an enterprise computing environment 100. Enterprise environment 100 includes a number of computing devices or applications that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources, various resource groups and users associated with an enterprise (for purposes of this disclosure any for profit or non-profit entity or organization). Users may have various roles, job functions, responsibilities, etc. to perform within various processes or tasks associated with enterprise environment 100. Users can include employees, supervisors, managers, IT personnel, vendors, suppliers, customers, robotic or application based users, etc. associated with enterprise 100.

Users may access resources of the enterprise environment 100 to perform functions associated with their jobs, obtain information about enterprise 100 and its products, services, and resources, enter or manipulate information regarding the same, monitor activity in enterprise 100, order supplies and services for enterprise 100, manage inventory, generate financial analyses and reports, or generally to perform any task, activity or process related to the enterprise 100. Thus, to accomplish their responsibilities, users may have entitlements to access resources of the enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of the enterprise 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; gain access to another user's entitlements or for other reasons. Access risks can also arise from roles in enterprise environment 100 which may shift, change, evolve, etc. leaving entitlements non optimally distributed among various users.

To assist in managing the entitlements assigned to various users and more generally in managing and assessing access risks in enterprise environment 100, an identity management system 150 may be employed. Such an identity management system 150 may allow an administrative or other type of user to define one or more identities and one or more entitlements and associate these identities with entitlements using, for example, an administrator interface 152. Examples of such identity management systems are Sailpoint's IdentityIQ and IdentityNow products. Note here, that while the identity management system 150 has been depicted in the diagram as separate and distinct from the enterprise environment 100 and coupled to enterprise environment 100 over a computer network 104 (which may the same as, or different than, network 102), it will be realized that such an identity management system 150 may be deployed as part of the enterprise environment 100, remotely from the enterprise environment, as a cloud based application or set of services, or in another configuration.

An identity may thus be almost physical or virtual thing, place, person or other item that an enterprise would like to define. For example, an identity may be a role or capacity, title, groups, processes, physical locations, individual users or humans or almost any other physical or virtual thing, place, person or other item. An entitlement may be the ability to perform or access a function within the distributed networked enterprise computer environment 100, including, for example, accessing computing systems, applications, file systems, particular data or data items, networks, subnetworks or network locations, etc. Each of these identities may therefore be assigned zero or more entitlements with respect to the distributed networked computer environments.

The identity management system 150 may thus store identity management data 154. The identity management data 154 stored may include a set entries, each entry corresponding to and including an identity (e.g., alphanumerical identifiers for identities) as defined and managed by the identity management system, a list or vector of entitlements assigned to that identity by the identity management system, and a time stamp at which the identity management data was collected from the identity management system. Other data could also be associated with each identity, including data that may be provided from other systems such as a title, location or department associated with the identity.

Collectors 156 of the identity management system 150 may thus request or otherwise obtain data from various touchpoint systems within enterprise environment 100. These touchpoint systems may include, for example Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite.

Accordingly, the collectors 156 of the identity management system 150 may obtain or collect event data from various systems within the enterprise environment 100 and process the event data to associate the event data with the identities defined in the identity management data 154 to evaluate or analyze these events or other data in an identity management context. A user may interact with the identity management system 150 through a user interface 158 to access or manipulate data on identities, entitlements, events or generally identity management with respect to enterprise environment 100.

As part of a robust identity management system, it is desirable to analyze the identity management data 154 associated with an enterprise 100. Specifically, It is desirable to group or cluster the identities of an enterprise 100 into peer groups such that the identities in a peer group are similar with respect to the set of entitlements assigned to the identities of that group (e.g., relative to other identities or other groups). Peer grouping of the identities within an enterprise (or viewing the peer groups of identities) may allow, for example, an auditor other person performing a compliance analysis or evaluation to quantitatively and qualitatively assess the effectiveness of any applicable pre-existing polices, or lack thereof, and how strictly they are enforced.

Accordingly, an identity management system 160 may include a harvester 162 and a graph generator 164. The harvester 162 may obtain identity management data from one or more identity management systems 150 associated with enterprise 100. The identity management data may be obtained, for example, as part of a regular collection or harvesting process performed at some regular interval by connecting to, and requesting the identity management data from, the identity management system 150. The identity management data stored may thus include a set entries, each entry corresponding to and including an identity as defined and managed by the identity management system, a list or vector of entitlements assigned to that identity by the identity management system, and a time stamp at which the identity management data was collected from the identity management system 150.

Graph generator 164 may generate a peer grouped identity graph from the obtained identity management data. Specifically, in one embodiment, an identity graph may be generated from the identity management data obtained from the enterprise. Each of the identities from the most recently obtained identity management data and a node of the graph created for each identity. An edge is constructed between every pair of nodes (e.g., identities) that shares at least one entitlement. Each edge of the graph may also be associated with a similarity weight representing a degree of similarity between the identities of the respective nodes joined by that edge. Accordingly, the obtained identity management data may be represented by an identity graph and stored in graph data store 166.

Once the identity graph is generated by the graph generator 164, the graph may then be pruned to remove edges based on their weighting. The pruned identity graph can then be used to cluster the identities into peer groups of identities. This clustering may be accomplished, for example, a community-detection algorithm. This clustering result may also be optimized by the graph generator 164 through the use of a feedback loop to optimize the pruning of the edges until a desired metric for assessing the quality of the peer groups generated exceeds a desired threshold. Once the peer groups of identities are determined, the peer groups can then be stored (e.g., separately or in the identity graph itself) and used by the identity management system 160. For example, each peer group may be assigned a peer group identifier and the peer group identifier associated with each identity assigned to the peer group by storing the peer group identifier in association with the node in the graph representing that identity.

An interface 168 of the identity management system 160 may use the identity graph in the graph data store 166 or associated peer groups to present one or more interface which may be used for risk assessment, as will be discussed. For example, an interface 168 may present a visual representation of the graph, the identities or the peer groups in the identity graph to a user of the identity management system 160 associated with enterprise 100 to assist in compliance or certification assessments or evaluation of the identities and entitlements as currently used by the enterprise (e.g., as represented in identity management data 154 of identity management system 150).

Before moving on, it will be noted here that while identity management system 160 and identity management system 150 have been depicted separately for purposes of explanation and illustration, it will be apparent that the functionality of identity management systems 150, 160 may be combined into a single or a plurality of identity management system as is desired for a particular embodiment and the depiction and separation of the identity management systems and their respective functionality has been depicted separately solely for purposes of ease of depiction and description.

Figure 2:
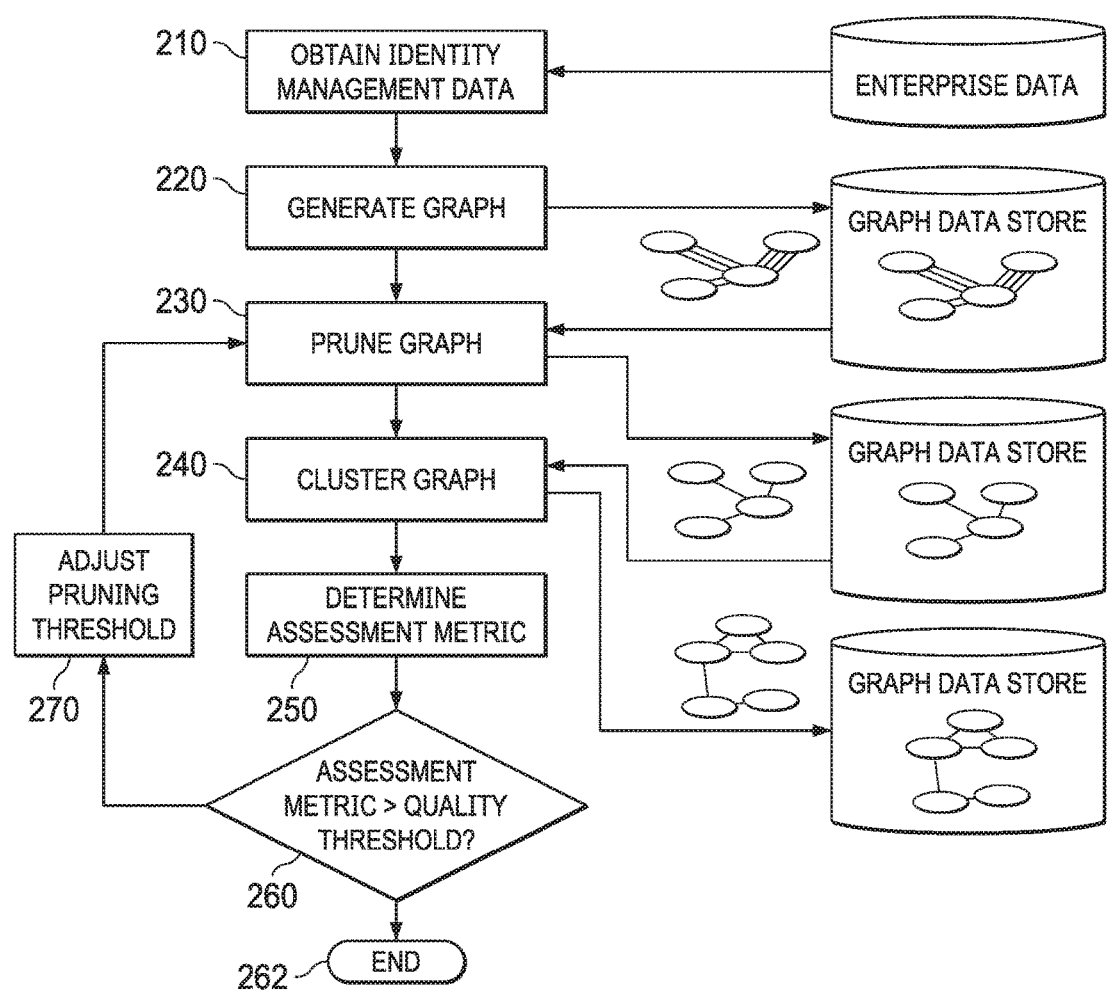
FIG. 2 is a flow diagram of one embodiment of a method for peer group detection and analysis using cluster based analysis of identity graphs.

Turning now to FIG. 2, a flow diagram for one embodiment of a method for determining peer groups of identities using a graph database is depicted. Embodiments of such a method may be employed by graph generators of identity management systems to generate identity graphs and associated peer groups from identity management data, as discussed above. Initially, at step 210, identity management data may be obtained. As discussed, in one embodiment, this identity management data may be obtained from one or more identity management systems that are deployed in association with an enterprise's distributed computing environment. Thus, the identity management data may be obtained, for example, as part of a regular collection or harvesting process performed at some regular interval by connecting to, requesting the identity management data from, an identity management system. The identity management data may also be obtained on a one-time or user initiated basis.

As will be understood, the gathering of identity management data and determination of peer groups can be implemented on a regular, semi-regular or repeated basis, and thus may be implemented dynamically in time. Accordingly, as the data is obtained, it may be stored as a time-stamped snapshot. The identity management data stored may thus include a set entries, each entry corresponding to and including an identity (e.g., alphanumerical identifiers for identities) as defined and managed by the identity management system, a list or vector of entitlements assigned to that identity by the identity management system, and a time stamp at which the identity management data was collected from the identity management system. Other data could also be associated with each identity, including data that may be provided from an identity management system such as a title, location or department associated with the identity. The collection of entries or identities associated with the same timestamp can thus be thought of as a snapshot from that time of the identities and entitlements of the enterprise computing environment as management by the identity management system.

As an example of identity management data that may be obtained from an identity management system, the following is one example of a Javascript Object Notation (JSON) object that may relate to an identity:

```
{
    "attributes": {
        "Department": "Finance",
```

```
            "costcenter": "[R01e, L03]",
            "displayName": "Catherine Simmons",
            "email": "Catherine.Simmons@demoexample.com",
            "empId": "1b2c3d",
            "firstname": "Catherine",
            "inactive": "false",
            "jobtitle": "Treasury Analyst",
            "lastname": "Simmons",
            "location": "London",
            "manager": "Amanda.Ross",
            "region": "Europe",
            "riskScore": 528,
            "startDate": "12/31/2016 00:00:00AM UTC",
            "nativeIdentity_source_2": "source_2",
            "awesome_attribute_source_1": "source_1",
            "twin_attribute_a": "twin a",
            "twin_attribute_b": "twin b",
            "twin_attribute_c": "twin c"
        },
        "id": "2c9084ee5a8de328015a8de370100082",
        "integration_id": "iiq",
        "customer_id": "ida-bali",
        "meta": {
            "created": "2017-03-02T07:19:37.233Z",
            "modified": "2017-03-02T07:24:12.024Z"
        },
        "name": "Catherine. Simmons",
        "refs": {
            "accounts": {
                "id": [
                    "2c9084ee5a8de328015a8de370110083"
                ],
                "type": "account"
            },
            "entitlements": {
                "id": [
                    "2c9084ee5a8de328015a8de449060e54",
                    "2c9084ee5a8de328015a8de449060e55"
                ],
                "type": "entitlement"
            },
            "manager": {
                "id": [
                    "2c9084ee5a8de022015a8de0c52b031d"
                ],
                "type": "identity"
            }
        },
        "type": "identity"
    }
```

As another example of identity management data that may be obtained from an identity management system, the following is one example of a JSON object that may relate to an entitlement:

```
{
    "integration_id": "bd992e37-bbe7-45ae-bbbf-c97a59194cbc",
    "refs": {
        "application": {
            "id": [
                "2c948083616ca13a01616ca1d4aa0301"
            ],
            "type": "application"
        }
    },
    "meta": {
        "created": "2018-02-06T19:40:08.005Z",
        "modified": "2018-02-06T19:40:08.018Z"
    },
    "name": "Domain Administrators",
    "attributes": {
        "description": "Domain Administrators group on Active Directory",
        "attribute": "memberOf",
        "aggregated": true,
        "requestable": true,
```

```
        "type": "group",
        "value": "cn=Domain Administrators, dc=domain,dc=local"
    },
    "id": "2c948083616ca13a01616ca1f1c50377",
    "type": "entitlement",
    "customer_id": "3a60b474-4f43-4523-83d1-eb0fd571828f"
}
```

At step 220 an identity graph may be generated from the identity management data obtained from the enterprise. Specifically, each of the identities from the most recent snapshot of identity management data may be obtained and a node of the graph created for each identity. An edge is constructed between every pair of nodes (e.g., identities) that shares at least one entitlement. (e.g., an edge connects two identity nodes if and only if they have at least one entitlement in common). Each edge of the graph may be associated with a similarity weight representing a degree of similarity between the identities of the respective nodes joined by that edge. This similarity weight may be generated based on the number of entitlements shared between the two joined nodes. As but one example, the similarity weight could be based on a count of the similarity (e.g., overlap or intersection of entitlements) between the two identities divided by the union of entitlements. For example, in one embodiment, the edges are weighted via a proper similarity function (e.g., Jaccard similarity). In one embodiment, a dissimilarity measure, of entitlement binary vectors, d, may be chosen, then the induced similarity, $1-d(x,y)$, may be used to assign a similarity weight to the edge joining the nodes, x,y. Other methods for determining a similarity weight between two nodes are possible and are fully contemplated herein.

In one specific, embodiment, a symmetric matrix may be determined with each of the user identities along each axis of the matrix. The diagonal of the matrix may be all 0s while the rest of values are the similarity weights determined between the two nodes on the axes corresponding to the value. In this manner, this symmetric matrix may be provided to a graph constructor which translates the identities on the axes and the similarity values of the matrix into graph store commands to construct the identity graph.

Accordingly, the identity management data may be faithfully represented by a k-partite graph, with k types of entities (nodes/vertices, e.g., identity-id, title, location, entitlement, etc.) and stored in a graph data store. It will be noted that graph data store 132 may be stored in any suitable format and according to any suitable storage, including, for example, a graph store such a Neo4j, a triple store, a relational database, etc. Access and queries to this graph data store may thus be accomplished using an associated access or query language (e.g., such as Cypher in the case where the Neo4j graph store is utilized).

Once the identity graph is generated, the graph may then be pruned at step 230. Here, the identity graph may then be pruned to remove weak edges (e.g., those edges whose similarity weight may fall below a pruning threshold). The pruning of the graph is associated with the locality aspect of identity governance, where an identity's access entitlements should not be directly impacted, if at all, by another identity with strongly dissimilar entitlement pattern (e.g., a weak connecting edge). Accordingly, the removal of such edges may not dramatically alter the global topology of the identity graph. An initial pruning threshold may be initially set or determined (e.g., as 50% similarity or the like) and may be substantially optimized or otherwise adjusted at a later point.

As another example, a histogram of similarity weights may be constructed and a similarity weight corresponding to a gap in the similarity weights of the histogram may be chosen as an initial pruning threshold.

The pruned identity graph can then be used to cluster the identities into peer groups of identities at step 240. Within this graph approach, a representation of a peer group could be represented by a maximal clique, where every identity is strongly connected (e.g., similar) to every other identity within the peer group, and consequently, members of the clique all share a relatively large, and hence dominant, common core of entitlements. The problem of finding all maximal cliques of a graph may, however, be a memory and computationally intensive problem. Most clique related problems in graph theory are hard and some of them are even NP-complete, requiring exponential time to finish as graphs with exponentially many maximal cliques may exist.

Accordingly, in one embodiment a community-detection algorithm may be utilized for peer grouping the identities of the identity graph to speed the determination of the peer groups, reduce computational overhead and conserve memory, among other advantages. A plethora of applicable and performant community-detection and graph clustering algorithms may be utilized according to certain embodiments. Some of these algorithms are specifically targeted to large graphs, which can be loosely described as graphs with at least tens or hundreds (or more) of thousands of nodes and millions of edges. Such graph community-detection algorithms may include, for example, Louvain, Fast-greedy, Label Propagation or Stochastic Block Modeling. Other graph community detection algorithms may be utilized and are fully contemplated herein.

In certain embodiments, a clustering result may be optimized through the use of a feedback loop, as discussed below. As such, in one embodiment it may be desirable to utilize a community-detection algorithm for determination of the peer groups that may provide allow a straightforward determination of a peer group assessment metric for a quality assessment of determined peer groups or the identity graph. Accordingly, a community-detection algorithm that may be based on, or allow a determination of, a graph based metric (e.g., modularity, evolving topology, connected components, centrality measures e.g., betweenness, closeness, community overlap measures (e.g., NMI, Omega indices)) that may be used as a peer group assessment metric may be utilized.

Specifically, in one embodiment, the Louvain algorithm may be utilized as a community-detection algorithm and modularity may be used as a peer assessment metric. The Louvain algorithm may not only be a scalable algorithm that can handle, and be efficient on, large graphs; but additionally the Louvain algorithm may be based on modularity or be modularity optimized. Modularity is a scalar that can be determined for a graph or groups or subgraphs thereof. This modularity reflects a likelihood of the clusters generated (e.g., by the algorithm) to not have been generated by random chance. A high modularity value, (e.g., positive and away from 0) may indicate that the clustering result is unlikely to be a product of chance. This modularity can thus be used as a peer group assessment metric.

Moreover, In addition to the application of a peer group assessment metric to optimize the peer groups or identity graphs determined using such community-detection algorithms, an identity management system may employ alerts based these peer group assessment metrics. For example, an alert to a user may be based on an alert threshold (e.g., if the peer group assessment metric drops below or above a certain threshold) or if any changes over a certain threshold occur with respect to the peer group assessment metric. For example, setting an empirical low threshold for modularity, with combined user alerts, could serve as a warning for deteriorating quality of peer groups or the identity graph. This could be due to input data has been corrupted at some point in pipeline, or in other cases, that the access entitlement process for the particular enterprise is extremely lacking due discipline. Regardless of the underlying cause, such an early warning system may be valuable to stop the propagation of questionable data quality in the peer group assessment and determination process and more generally to identity management goals within the enterprise.

In many cases, the community-detection or other clustering algorithm utilized in an embodiment may fall under the umbrella of what are usually termed unsupervised machine-learning. Results of these types of unsupervised learning algorithms may leave some room for interpretation, and do not, necessarily or inherently, provide outputs that are optimized when the domain or context in which they are being applied are taken into account. Consequently, to mitigate some of these issues and to optimize the use of the peer groups and identity graphs in an identity governance context, embodiments of identity management systems employing such peer groups of identities using an identity graph may allow some degree of user configuration, where at a least a portion of the user configuration may be applied in the graph determination, peer-grouping or optimization of such peer group determination.

This configurability may allow the user of an identity management system to, for example, impose some constraints or set up certain configuration parameters for the community-detection (or other peer grouping) algorithm in order to enhance the clustering results for a particular use-case or application. A few non-exhaustive examples of user configuration are thus presented. A user may have a strongly defined concept of what constitutes a 'peer'. This may entail that the user's specification of what continues a peer may be used to derive a pruning threshold with statistical methods (e.g., rather than relying on modularity).

As another example of configurability, a user may elect to opt for a hierarchical clustering output, or that peer groups should have certain average size, which may entail to allowing for several consecutive iterations of the community-detection algorithm to be performed (as will be explained in more detail herein). A user may also elect to run the peer grouping per certain portions of the identities, versus running it for all identities. The filtered population of identities may be specified in terms of geographic location, business role, business unit, etc. Similarly, a user may elect to filter the outputs of the community-detection algorithm in terms of certain identity attributes, e.g., identity role, identity title, identity location, etc. The results might then be quantitatively and qualitatively contrasted against existing governance policies to measure, assess and certify compliance with these policies.

Generally then, a user may elect to utilize the peer grouping feature in combination with other tools of identity governance, in order to gain more insight into the quality of identity governance policy enforcement within the business. This entails that peer grouping should be configurable and flexible enough to allow it to be paired with other (e.g., third-party) identity management tools. Accordingly, certain restrictions may be imposed on the identity graph's or peer group's size, format, level of detail, etc.

In any event, once the peer groups of identities pruned identity graph can then be used to cluster the identities into peer groups of identities at step 240 the determined peer groups can then be stored (e.g., separately or in the identity graph itself) and used by the identity management system. For example, each peer group may be assigned a peer group identifier and the peer group identifier associated with each identity assigned to the peer group by storing the peer group identifier in association with the node in the graph representing that identity.

As an example of use a visual representation of the graph, the identities or the peer groups in the identity graph may be presented to a user of the identity management to assist in compliance or certification assessments or evaluation of the identities and entitlements as currently used by the enterprise. In principle, strictly enforced pre-existing governance policies should ensure that identities with strongly similar access privileges are strongly similar (e.g., are in the same peer group). The presentation of such peer groups may thus, for example, allow an auditor or compliance assessor to quantitatively and qualitatively assess the effectiveness of any applicable pre-existing polices, or lack thereof, and how strictly they are enforced.

During such collection, graph determination and peer grouping steps, in certain embodiments, a number of efficiencies may be implemented to speed the collection process, reduce the amount data that must be stored and to reduce the computer processing overhead and computing cycles associated with such data collection, graph determination and peer grouping of such data. Specifically, in one embodiment, a delta change assessment may be performed when identity management data is collected or peer groups are determined in a current time period. More specifically, if identity management data was collected in a previous time period, or a previous peer grouping has been performed on identities of a previously created identity graph, an assessment can be made (e.g., by a data querying script or process) of the difference (or delta) between the set of identities corresponding to the most recent previous snapshot and the set of identities obtained in the current time period. This assessment may comprise a determination of how many changes to the identities, associated entitlements or other attributes have occurred between the time of the previous snapshot and the current snapshot (e.g., the most recently identity management data collected in the current time period).

An assessment may also be made of the difference between the peer groups determined from the most recent previous snapshot and the peer groups obtained in the current time period. This assessment may comprise a determination of how many identities are associated with different peer groups (e.g., relative to the peer grouping of identities determined from the previous most recent snapshot), changes to the identities or how many new identities are associated with an established (or new) peer group.

If there are no determined changes, or the changes are below some threshold number, or are few, local, or insignificant to a large majority of existing peer groups, then no action is needed other than updating the affected identities in the data of the previous snapshot or the identity graph. New entries in the entries comprising the current snapshot of identities may be created for any newly identified identities. Additionally, nodes in the graph corresponding to new identities can be appended to an appropriate peer group based on how similar this new identity to existing peer groups, (e.g., assign the new identity the peer group of the same department/title).

If the differences (e.g., number of changes, new identities, different peer group assignments, etc.) are non-trivial, affecting a multitude of identities across peer groups, then a new peer grouping process may occur on the newly refreshed data. In such case, a detection algorithm may be used to evolve, and persist, previously determined peer groups into their recent counterparts. This can be done by monitoring certain 'marker' identities, e.g., influencers, or identities with high centrality values and/or high degree of connections, in both versions of peer groups. Utilizing a majority vote approach, it can be determined how previous peer groups evolve into newer ones. Expected updated versions of the previous peer group, include splitting, merging, growth, shrinkage. Newer split peer groups may, for example inherit the 'old' peer group identifiers.

Embodiments of such a delta detection and updating mechanisms may have the further advantage of allowing the quality and stability of each peer group to be monitored by an identity management system via tracking the peer groups or identity graph, the changes thereto, or their evolution over time. By actively monitoring and assessing the degree of these changes between two or more consecutive versions of a peer group or identity graph, deteriorating quality issues may be detected as they arise or manifest in the identity graph or peer groups determined therefrom. Similarly, using the identity graphs, peer groups or peer group assessment metrics determined therefrom, a graph evolution model may be built in certain embodiments, (e.g., based on epidemiology susceptible, infected and recovered type models). Comparing the observed evolution of identities, entitlements or peer groups versus theoretical predictions may provide another tool to warn users of an identity management system against rapid or extreme changes that may negatively impact the quality of peer groups or identity management more generally.

Again, once the peer groups of identities are determined from the pruned identity graph and stored (at step 240), a peer group assessment metric may be determined based on the identity graph or the determined peer groups at step 250. As discussed, this peer group assessment metric may be determined separately based on the peer groups or identity graph determined, or may be metric utilized by a community-detection algorithm, such that the peer group assessment metric may be determined as part of the peer group determination process. In certain embodiments then, the application of a community-detection algorithm may result in such a peer group assessment metric (e.g., modularity, evolving topology, connected components, centrality measures e.g., betweenness, closeness, community overlap measures (e.g., NMI, Omega indices)) that may be used as a peer group assessment metric may be utilized.

For example, as discussed above the Louvain algorithm may be a graph-based modularity optimized community-detection algorithm. Thus, a modularity associated with the determined peer groups may result from the determination of the peer group using the Louvain algorithm. Modularity is a scalar that can be determined for a graph or groups or subgraphs thereof and reflects a likelihood of the clusters generated (e.g., by the algorithm) to not have been generated by random chance. A high modularity value, (e.g., positive and away from 0) may indicate that the clustering result is unlikely to be a product of chance. This modularity can be used as a peer group assessment metric in one embodiment.

Accordingly, in certain embodiments, the clustering of identities into peer groups may be optimized based on this peer group assessment metric. Specifically, a feedback loop may be utilized to determine the optimal pruning threshold. The optimization loop may serve to substantially increase or maximize the quality of the graph clustering, with respect to certain proper metrics (e.g., graph modularity or other peer group assessment metric). Additional domain-specific, per enterprise, criteria may be utilized in this step in certain embodiments in order to render clustering results that accurately reflect certain requirements to better serve a particular enterprise or use of the per groups or identity graph.

For instance, in one embodiment if the peer group assessment metric is above (or above) a quality threshold at step 260 the determination of peer groups of identities for the obtained in the current snapshot may end at step 262. The determined peer groups of identities can then be stored (e.g., separately or in the identity graph) and used by the identity management system.

However, if the peer group assessment metric is below (or above) a quality threshold at step 260 a feedback loop may be instituted whereby the pruning threshold is adjusted by some amount at step 270 (up or down) and the originally determined identity graph is again pruned based on the adjusted pruning threshold (or the previously pruned identity graph may be further pruned) at step 230. The adjustment of the pruning threshold may be based on a wide variety of criteria in various embodiments and may be adjust be a fixed or differing amount in every iteration through the feedback loop. Additionally, in some embodiments, various machine learning techniques (e.g., unsupervised machine learning techniques such as k-means, method of moments, neural networks, etc.) may be used to determine an amount to adjust the pruning threshold or a value for the adjusted pruning threshold). This newly pruned identity graph can then be clustered into new peer groups of identities at step 240 and a peer group assessment metric determined at step 250 based on the newly pruned identity graph or the newly determined peer groups.

If this new peer assessment metric is now above (or below) the quality threshold at step 260 the feedback loop may be stopped and the determination of peer groups of identities for the obtained in the current snapshot may end at step 262. These peer groups of identities can then be stored (e.g., separately or in the identity graph) and used by the identity management system.

Otherwise, the feedback loop may continue by again adjusting the pruning threshold further at step 270 (e.g., further up or further down relative to the previous iteration of the feedback loop), re-pruning the identity graph based on the adjusted pruning threshold at step 230, clustering this newly pruned graph at step 240, determining another peer group assessment metric at step 250 and comparing this metric to the quality threshold at step 260. In this manner, the feedback loop of adjustment of the pruning threshold, re-pruning the graph, re-clustering the identity graph into peer groups may be repeated until the peer group assessment metric reaches a desired threshold. Moreover, by tailoring the peer group assessment metric and quality threshold to include or reflect domain or enterprise specific criteria (e.g., which may be specified by a user of the identity management system), the clustering results (e.g., the peer groups resulting from the clustering) may more accurately reflect particular requirements or the needs of a particular enterprise or be better tailored to a particular use.

Once the feedback loop is ended (step 262) the determined peer groups of identities can then be stored (e.g., separately or in the identity graph) and used by the identity management system. For example, a visual representation of the graph may be presented to a user of the identity management to assist in compliance or certification assessments or evaluation of the identities and entitlements as currently used by the enterprise.

It may now be helpful to look at such visual depictions and presentations of identity graphs or interfaces that may be created or presented based on such identity graphs. It will be apparent that these depictions and interfaces are but example of depictions and interfaces that may presented or utilized, and that almost any type of presentation, depiction or interface based on the identities, entitlements, peer groups other associated data discussed may be utilized in association with the embodiments of identity management systems disclosed herein.

As discussed embodiments of the identity management systems as disclosed may create, maintain or utilize identity graphs. These identity graphs may include a graph comprised of nodes and edges, where the nodes may include identity management nodes representing, for example, an identity, entitlement or peer group, and the edges may include relationships between these identity management nodes. The relationships represented by the edges of the identity graph may be assigned weights or scores indicating a degree of similarity between the nodes related by a relationship, including, for example, the similarity between two nodes representing an identity as discussed. Additionally, the relationships may be directional, such that they may be traversed only in a single direction, or have different weightings depending on the direction in which the relationship is traversed or the nodes related. Embodiments of such an identity graph can thus be searched (or navigated) to determine data associated with one or more nodes. Moreover, the similarity between, for example, the identities may be determined using the weights of the relationships in the identity graph.

Specifically, in certain embodiments, an identity graph may be thought of as a graph comprising a number of interrelated nodes. These nodes may include nodes that may have labels defining the type of the node (e.g., the type of "thing" or entity that the node represents, such as an identity, entitlement or peer group) and properties that define the attributes or data of that node. For example, the labels of the nodes of an identity graph may include "Identity", "Entitlement" or "PeerGroup". Properties of a node may include, "id", "company", "dept", "title", "location", "source" "size", "clique", "mean_similarty", or the like.

The nodes of the identity graph may be interrelated using relationships that form the edges of the graph. A relationship may connect two nodes in a directional manner. These relationships may also have a label that defines the type of relationship and properties that define the attributes or data of that relationship. These properties may include an identification of the nodes related by the relationship, an identification of the directionality of the relationship or a weight or degree of affinity for the relationship between the two nodes. For example, the labels of the relationships of an identity graph may include "Similarity" or "SIM", "Has_Entitlement" or "HAS_ENT", "Belongs_To_PeerGroup" or "BELONGS_TO_PG", or the like.

Figure 3A:
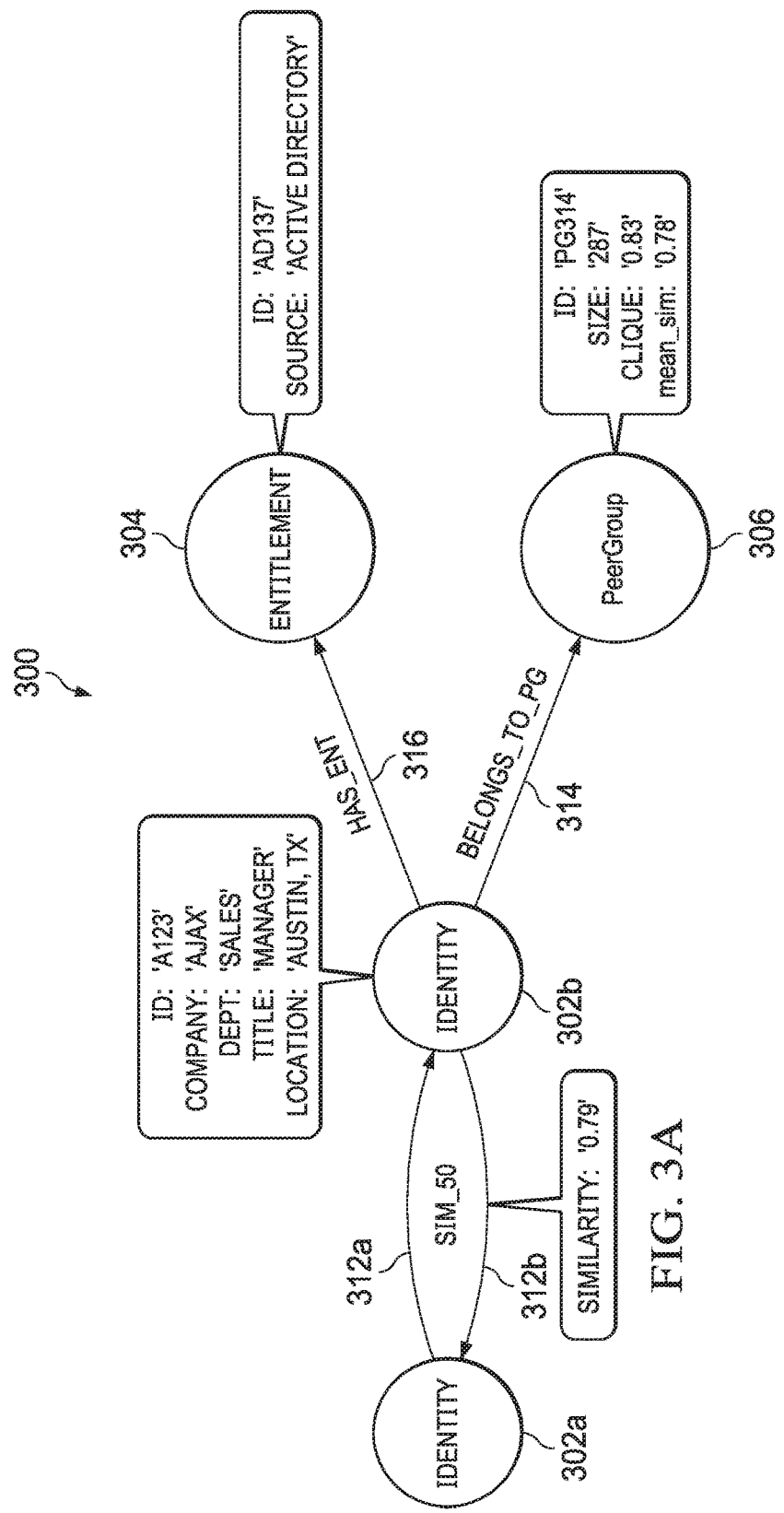
FIGS. 3A, 3B, 3C and 3D depict example visual representations of identity graphs.

Referring then to FIG. 3A, a graphical depiction of a portion of an example identity graph 300 is depicted. Here, nodes are represented by circles and relationships are represented by the directional arrows between the nodes. Such an identity graph 300 may represent identities, entitlements or peer groups, their association, and the degree of similarity between identities represented by the nodes. Thus, for example, the identity nodes 302a, 302b have the label "Identity" indicating they are identity nodes. Identity node 302b is shown as being associated with a set of properties that define the attributes or data of that identity node 302b, including here that the "id" of identity node 302b is "a123", the "company" of identity node 302b is "Ajax", the "dept" of identity node 302b is "Sales", the "title" of identity node 302b is "Manager", and the "location" of identity node 302b is "Austin, Tex.".

These identity nodes 302 of the identity graph 300 are joined by edges formed by directed relationships 312a, 312b. Directed relationship 312a may represent that the identity of identity node 302a is similar to (represented by the labeled "SIM" relationship 312a) the identity represented by identity node 302b. Similarly, directed relationship 312b may represent that the identity of identity node 302b is similar to (represented by the labeled "SIM" relationship 312b) the identity represented by identity node 302a. Here, relationship 312b has been assigned a similarity weight of 0.79. Notice that while these relationships 312a, 312b are depicted as individual directional relationships, such a similar relationship may be a single bidirectional relationship assigned a single similarity weight.

Entitlement node 304 has the label "Entitlement" indicating that it is an entitlement node. Entitlement node 304 is shown as being associated with a set of properties that define the attributes or data of that entitlement node 304, including here that the "id" of entitlement node 304 is "ad137", and the "source" of entitlement node 304 is "Active Directory". Identity node 302b and entitlement node 304 of the identity graph 300 are joined by an edge formed by directed relationship 316. Directed relationship 316 may represent that the identity of identity node 302b has (represented by the labeled "HAS_ENT" relationship 316) the entitlement represented by entitlement node 304.

Peer group node 306 has the label "PeerGroup" indicating that it is a peer group node. Peer group node 306 is shown as being associated with a set of properties that define the attributes or data of that peer group node 306, including here that the "id" of peer group node 306 is "pg314", the "size" of peer group node 306 is "287", the "clique" of peer group node 306 is "0.83" and the "mean_sim" or mean similarity value of peer group node 306 is "0.78". Identity node 302b and peer group node 306 of the identity graph 300 are joined by an edge formed by directed relationship 314. Directed relationship 314 may represent that the identity of identity node 302b belongs to (represented by the labeled "BELONGS_TO_PG" relationship 314) the peer group represented by entitlement node 304.

Figure 3B:
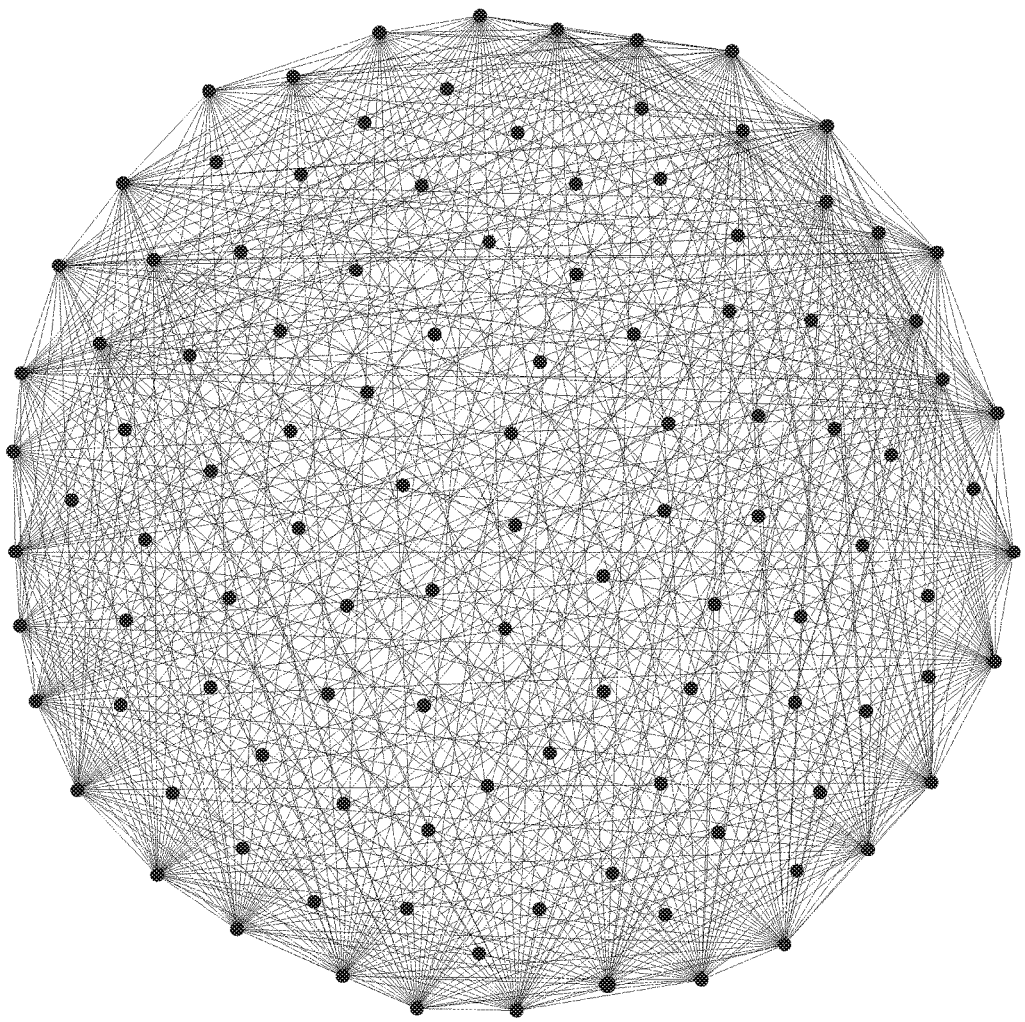
Figure 3C:
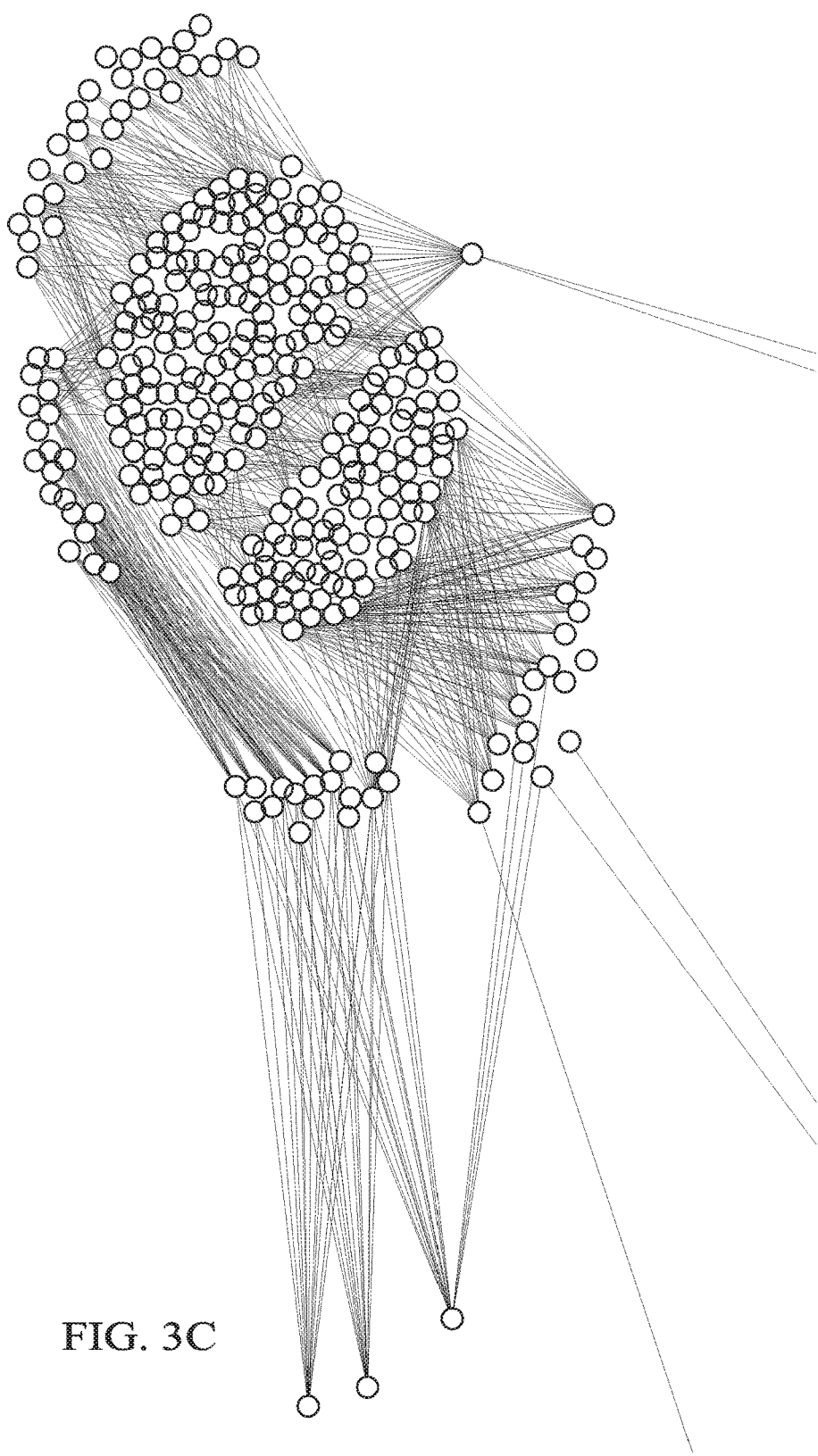
Figure 3D:
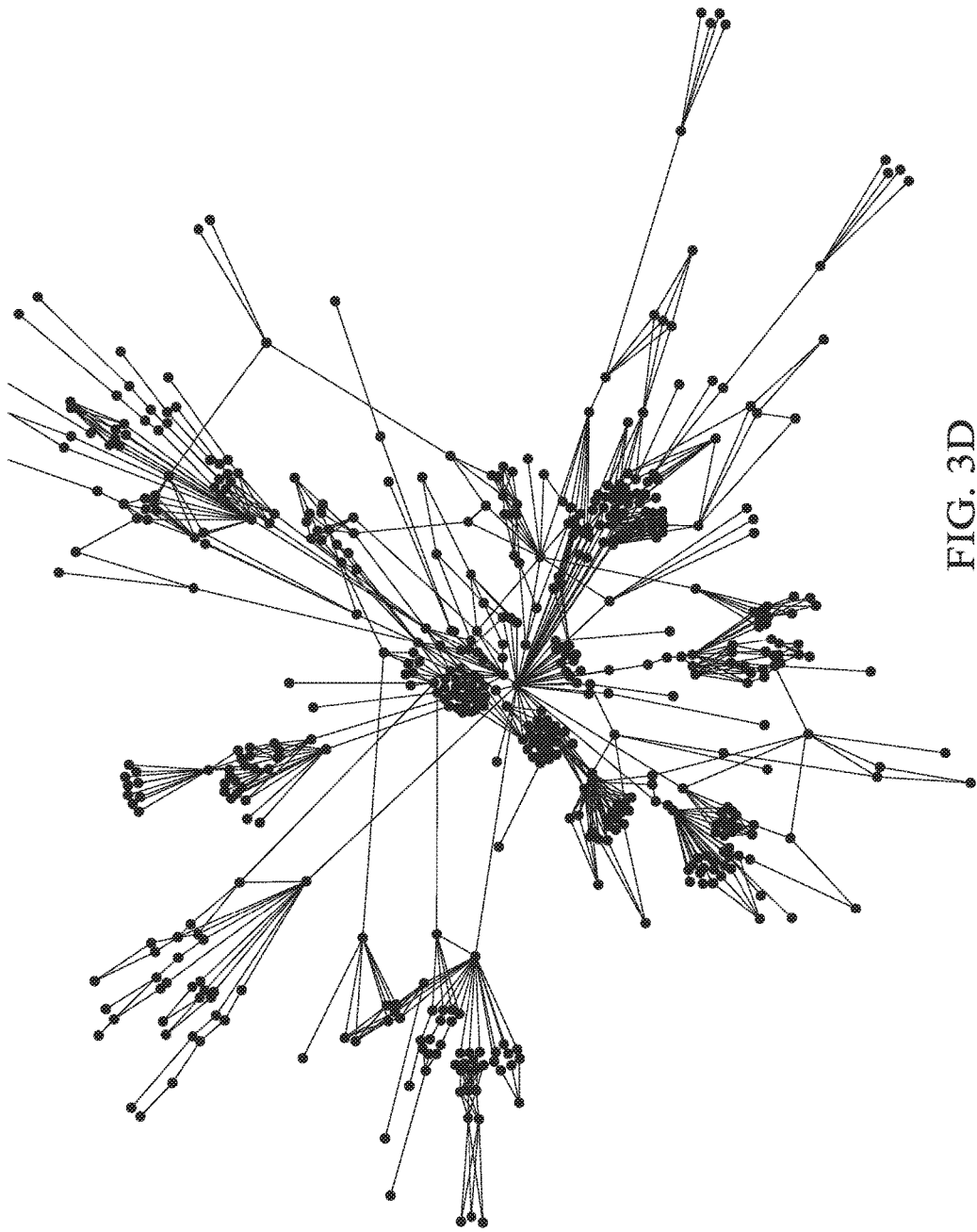

Now referring to FIGS. 3B, 3C and 3D, example representations of peer groupings within identity graphs are depicted. Here, each identity node of an identity graph is represented by a circle and each edge is represented by a line joining the nodes. In these visual depictions, the closer the nodes the higher the similarity value between the nodes. Such visual depictions when presented to a user may allow a user to better perceive the number of identities utilized by an enterprise, the relationships between those identities, the distribution of entitlements with respect to those identities or other information related to the identities or entitlements that may be utilized in identity governance and management, including for example, compliance assessment or auditing.

Figure 4:
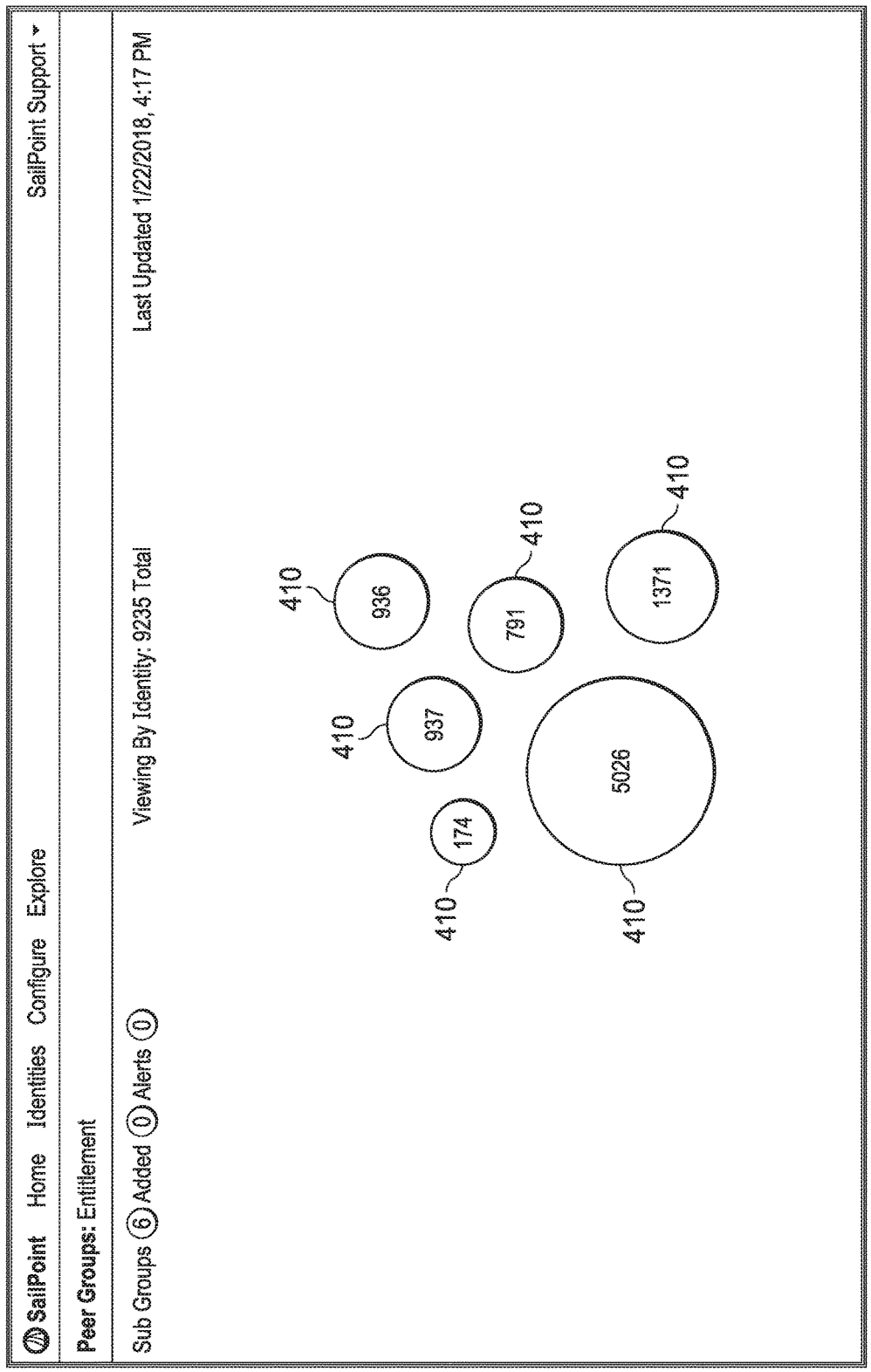
FIGS. 4-7 depict interfaces that may be utilized by embodiments of an identity management system.

FIG. 4 depicts an embodiment of an interface that may be utilized by an identity management system to visually present data regarding the peer groups determined for identities within an enterprise. In this example, the enterprise has 9235 associated identities, and the interface depicts that there are 6 peer groups of those identities that have been determined based on the entitlements associated with the identities. Each of the depicted circles 410 within the interface represents one of the peer groups and displays the number of identities associated with each of those peer groups. Moreover, the size and location of each circle 410 may depict the relative size of the peer groups of the identities and the number of entitlements shared between those peer groups, or identities within those peer groups.

Figure 5:
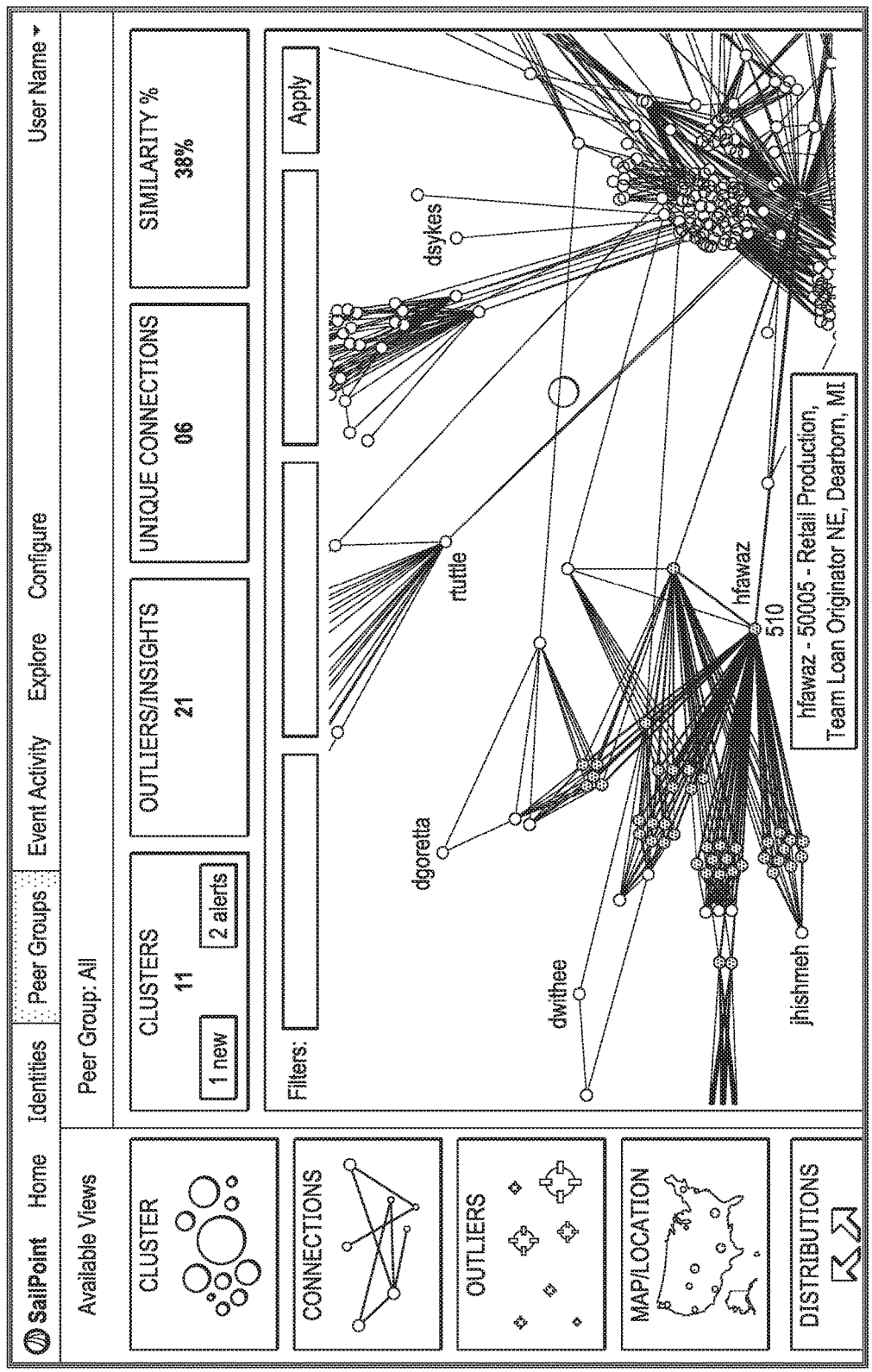

FIG. 5 depicts an embodiment of interface that may be utilized by an identity management system to visually present data regarding the peer groups determined for identities within an enterprise. Here, the interface may present a visual representation of the identity graph as discussed above where each identity node is represented by a circle and each edge is represented by a line joining the nodes, where the closer the nodes the higher the similarity value between the nodes. The interface may also present information regarding the number of peer groups (clusters) determined for the identity graph being presented (in this example 11).

The interface, or a portion thereof, may allow the user to navigate around the identity graph and "drill down" to obtain information on a represented node or entitlement. In the depicted example, the user has hovered above a node 510 of the identity graph and information about that identity is presented through the interface to the user. By looking at such an identity graph a user may be able to discern, for example, which identities which may be "highly contagious" or represent other identity management risks or compliance issues. An identity may be "highly contagious" or otherwise represent an identity governance risk, for example, if that identity may be have a number or type of entitlement such that if those identities are replicated without identity governance oversight (e.g., assigned to other users) it may cause identity governance issues such as unintended entitlement bloom.

Figure 6:
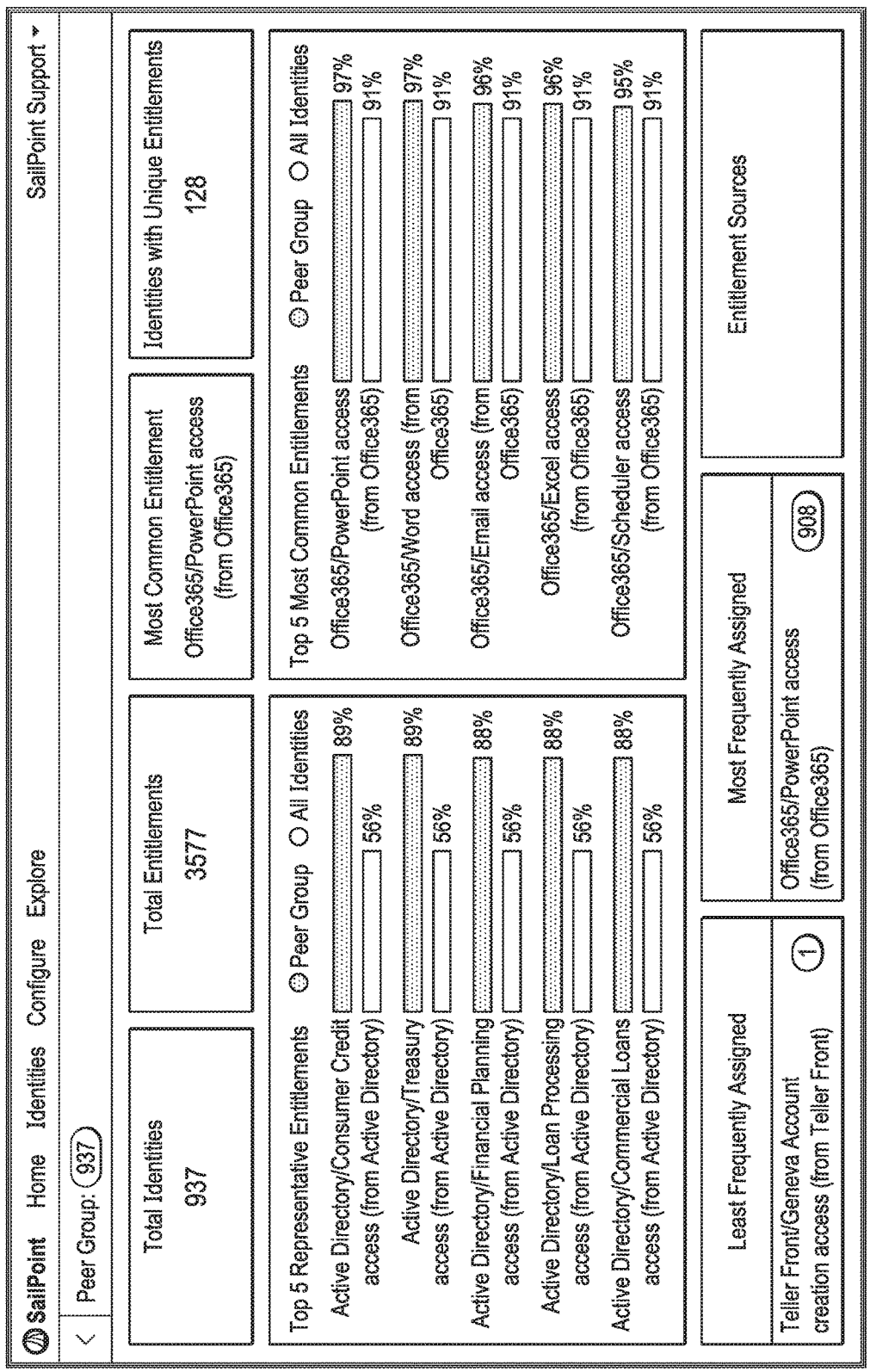

FIG. 6 depicts an embodiment of another interface that may be utilized by an identity management system to visually present data regarding the peer groups determined for identities within an enterprise. In this example, the interface can present data regarding a particular peer group determined for an identity graph, showing, for example, the number of identities within that peer group, what the entitlements are within that peer group, what identities share those entitlements, or why those identities have been grouped together. The interface may also present a wide variety of other data regarding that peer group or identities or entitlements within that (or other) peer groups, including for example, how that peer group, identities within that peer group or other entitlements relate to each other or other determined peer groups, identities or entitlements of the enterprise. Thus, a user viewing such an interface may be able to ascertain reasons why the identities have been grouped and explore for outliers and see entitlements that these identities have in common with each other, as well as how different they are from the rest of the identities and entitlements of an enterprise. Moreover, the user may also "drill down" for more details to discover which identities included and the entitlements assigned.

Figure 7:
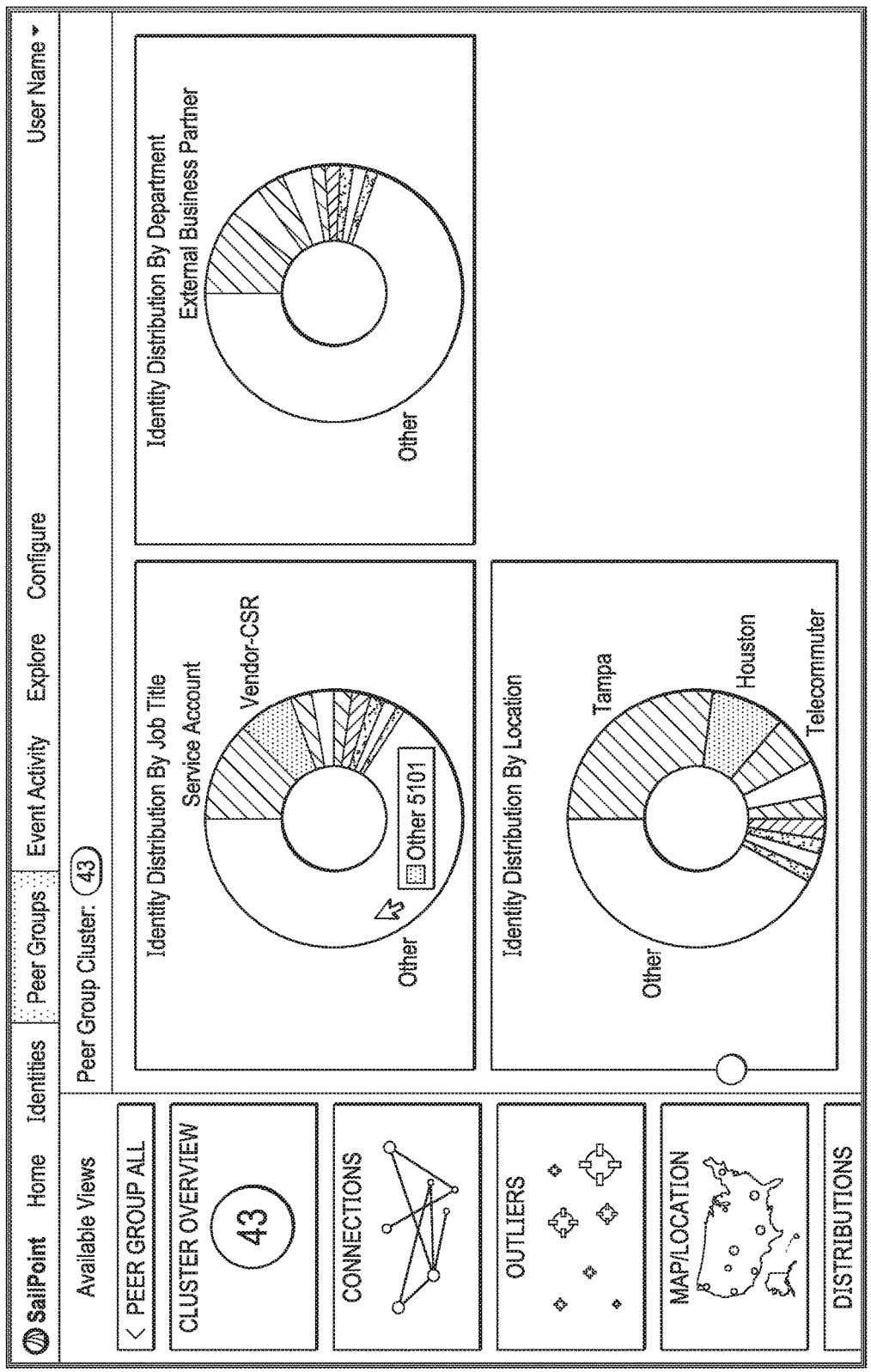

FIG. 7 depicts an embodiment of still another interface that may be utilized by an identity management system to visually present data regarding the peer groups determined for identities within an enterprise. In this example, the interface can present data regarding a particular peer group (e.g., peer group 43) determined for an identity graph, showing, for example, distributions of identities within the peer group, such as the identities of the peer group's correlation with departments, location or job title.

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. An identity management system, comprising:
   a graph data store;
   a processor;
   a non-transitory, computer-readable storage medium including computer instructions for:
   obtaining identity management data from one or more identity management systems in a distributed enterprise computing environment, the identity management data comprising data on a set of identities and a set of entitlements associated with the set of identities utilized in identity management in the distributed enterprise computing environment;
   evaluating the identity management data to determine the set of identities and a set of entitlements associated with the set of identities;
   generating a first identity graph from the identity management data by:
     creating a node of the first identity graph for each of the determined set of identities,
     for each first identity and second identity that share at least one entitlement of the set of entitlements, creating an edge of the first identity graph between a first node representing the first identity and a second node of the identity graph representing the second identity, and
     generating a similarity weight for each edge of the first identity graph between each first node and second node based on the set of entitlements associated with the first identity represented by the first node and the second identity represented by the second node;
   storing the first identity graph in the graph data store;
   pruning the set of edges of the first identity graph to generate a second identity graph;
   storing the second identity graph in the graph data store;
   clustering the set of identities represented by the nodes of the second identity graph into a set of peer groups based on the second identity graph, including the nodes of the second identity graph representing the set of identities and the edges of the second identity graph;
   associating each of the set of identities with a corresponding peer group; and
   generating an interface based on the second identity graph and the association between each of the set of identities and the corresponding peer group.

2. The system of claim 1, wherein generating the similarity weight for each edge of the first identity graph between each first node and second node based on the set of entitlements is done based on a number of the set of entitlements shared between the first identity represented by the first node and the second identity represented by the second node.

3. The system of claim 1, wherein clustering the second identity graph is accomplished using community-detection.

4. The system of claim 3, wherein clustering the second identity graph is optimized based on a peer group assessment metric.

5. The system of claim 4, wherein the peer group assessment metric is a modularity value resulting from clustering of the set of identities.

6. The system of claim 4, wherein the instructions are further for:
   determining the peer group assessment metric based on the set of peer groups and comparing the peer group assessment metric to a quality threshold, and
   when the peer group assessment metric is below the quality threshold:
   a) adjusting a pruning threshold associated with the pruning of the set of edges of the first identity graph to generate the second identity graph;
   b) pruning the set of edges of the first identity graph to generate the second identity graph based on the similarity weight associated with each edge of the first identity graph and the adjusted pruning threshold;
   c) clustering the set of identities represented by the nodes of the second identity graph into a set of peer groups based on the second identity graph, including the nodes of the second identity graph representing the set of identities, the edges of the second identity graph and the similarity weights of each of the edges of the second identity graph;
   d) determining the peer group assessment metric and comparing the peer group assessment metric to the quality threshold; and
   e) repeating steps a-d until the peer group assessment metric exceeds the quality threshold.

7. The system of claim 6, wherein the instructions are further for adjusting the pruning threshold a first amount a first time steps a-d are performed and adjusting the pruning threshold a second amount a second time steps a-d are performed.

8. A method, comprising:
   obtaining identity management data from one or more identity management systems in a distributed enterprise computing environment, the identity management data comprising data on a set of identities and a set of entitlements associated with the set of identities utilized in identity management in the distributed enterprise computing environment;
   evaluating the identity management data to determine the set of identities and a set of entitlements associated with the set of identities;
   generating a first identity graph from the identity management data by:
     creating a node of the first identity graph for each of the determined set of identities,
     for each first identity and second identity that share at least one entitlement of the set of entitlements, creating an edge of the first identity graph between a first node representing the first identity and a second node of the identity graph representing the second identity, and generating a similarity weight for each edge of the first identity graph between each first node and second node based on the set of entitlements associated with the first identity represented by the first node and the second identity represented by the second node;

storing the first identity graph in a graph data store;

pruning the set of edges of the first identity graph to generate a second identity graph;

storing the second identity graph in the graph data store;

clustering the set of identities represented by the nodes of the second identity graph into a set of peer groups based on the second identity graph, including the nodes of the second identity graph representing the set of identities and the edges of the second identity graph;

associating each of the set of identities with a corresponding peer group; and generating an interface based on the second identity graph and the association between each of the set of identities and the corresponding peer group.

9. The method of claim 8, wherein generating the similarity weight for each edge of the first identity graph between each first node and second node based on the set of entitlements is done based on a number of the set of entitlements shared between the first identity represented by the first node and the second identity represented by the second node.

10. The method of claim 8, wherein clustering the second identity graph is accomplished using community-detection.

11. The method of claim 10, wherein clustering the second identity graph is optimized based on a peer group assessment metric.

12. The method of claim 11, wherein the peer group assessment metric is a modularity value resulting from clustering of the set of identities.

13. The method of claim 11, further comprising:

determining the peer group assessment metric based on the set of peer groups and comparing the peer group assessment metric to a quality threshold, and when the peer group assessment metric is below the quality threshold:

a) adjusting a pruning threshold associated with the pruning of the set of edges of the first identity graph to generate the second identity graph;

b) pruning the set of edges of the first identity graph to generate the second identity graph based on the similarity weight associated with each edge of the first identity graph and the adjusted pruning threshold;

c) clustering the set of identities represented by the nodes of the second identity graph into a set of peer groups based on the second identity graph, including the nodes of the second identity graph representing the set of identities, the edges of the second identity graph and the similarity weights of each of the edges of the second identity graph;

d) determining the peer group assessment metric and comparing the peer group assessment metric to the quality threshold; and e) repeating steps a-d until the peer group assessment metric exceeds the quality threshold.

14. The method of claim 13, further comprising adjusting the pruning threshold a first amount a first time steps a-d are performed and adjusting the pruning threshold a second amount a second time steps a-d are performed.

15. A non-transitory computer readable medium, comprising instructions for:

obtaining identity management data from one or more identity management systems in a distributed enterprise computing environment, the identity management data comprising data on a set of identities and a set of entitlements associated with the set of identities utilized in identity management in the distributed enterprise computing environment;

evaluating the identity management data to determine the set of identities and a set of entitlements associated with the set of identities;

generating a first identity graph from the identity management data by:

creating a node of the first identity graph for each of the determined set of identities, for each first identity and second identity that share at least one entitlement of the set of entitlements, creating an edge of the first identity graph between a first node representing the first identity and a second node of the identity graph representing the second identity, and generating a similarity weight for each edge of the first identity graph between each first node and second node based on the set of entitlements associated with the first identity represented by the first node and the second identity represented by the second node;

storing the first identity graph in a graph data store;

pruning the set of edges of the first identity graph to generate a second identity graph;

storing the second identity graph in the graph data store;

clustering the set of identities represented by the nodes of the second identity graph into a set of peer groups based on the second identity graph, including the nodes of the second identity graph representing the set of identities and the edges of the second identity graph;

associating each of the set of identities with a corresponding peer group; and generating an interface based on the second identity graph and the association between each of the set of identities and the corresponding peer group.

16. The non-transitory computer readable medium of claim 15, wherein generating the similarity weight for each edge of the first identity graph between each first node and second node based on the set of entitlements is done based on a number of the set of entitlements shared between the first identity represented by the first node and the second identity represented by the second node.

17. The non-transitory computer readable medium of claim 15, wherein clustering the second identity graph is accomplished using community-detection.

18. The non-transitory computer readable medium of claim 17, wherein clustering the second identity graph is optimized based on a peer group assessment metric.

19. The non-transitory computer readable medium of claim 18, wherein the peer group assessment metric is a modularity value resulting from clustering of the set of identities.

20. The non-transitory computer readable medium of claim 18, further comprising instructions for:

determining the peer group assessment metric based on the set of peer groups and comparing the peer group assessment metric to a quality threshold, and when the peer group assessment metric is below the quality threshold:

a) adjusting a pruning threshold associated with the pruning of the set of edges of the first identity graph to generate the second identity graph;
b) pruning the set of edges of the first identity graph to generate the second identity graph based on the similarity weight associated with each edge of the first identity graph and the adjusted pruning threshold;
c) clustering the set of identities represented by the nodes of the second identity graph into a set of peer groups based on the second identity graph, including the nodes of the second identity graph representing the set of identities, the edges of the second identity graph and the similarity weights of each of the edges of the second identity graph;
d) determining the peer group assessment metric and comparing the peer group assessment metric to the quality threshold; and
e) repeating steps a-d until the peer group assessment metric exceeds the quality threshold.

21. The non-transitory computer readable medium of claim 20, further comprising instructions for adjusting the pruning threshold a first amount a first time steps a-d are performed and adjusting the pruning threshold a second amount a second time steps a-d are performed.

* * * * *